(12) United States Patent
Lee

(10) Patent No.: US 9,849,648 B2
(45) Date of Patent: Dec. 26, 2017

(54) CLEANING APPARATUS FOR MOBILE DEVICE

(71) Applicant: Chan Kwon Lee, Ansan-si (KR)

(72) Inventor: Chan Kwon Lee, Ansan-si (KR)

( * ) Notice: Subject to any disclaimer, the term of this patent is extended or adjusted under 35 U.S.C. 154(b) by 199 days.

(21) Appl. No.: 14/767,916

(22) PCT Filed: Feb. 11, 2014

(86) PCT No.: PCT/KR2014/001128
§ 371 (c)(1),
(2) Date: Aug. 14, 2015

(87) PCT Pub. No.: WO2014/126376
PCT Pub. Date: Aug. 21, 2014

(65) Prior Publication Data
US 2015/0374194 A1 Dec. 31, 2015

(30) Foreign Application Priority Data

Feb. 14, 2013 (KR) .................... 10-2013-0016064
Feb. 18, 2013 (KR) .................... 10-2013-0017178
(Continued)

(51) Int. Cl.
*B32B 3/30* (2006.01)
*B32B 7/12* (2006.01)
(Continued)

(52) U.S. Cl.
CPC ............... *B32B 3/30* (2013.01); *A47L 25/00* (2013.01); *B32B 3/02* (2013.01); *B32B 7/02* (2013.01);
(Continued)

(58) Field of Classification Search
CPC combination set(s) only.
See application file for complete search history.

(56) References Cited

U.S. PATENT DOCUMENTS 3,386,793 A * 6/1968 Stanton .................. A47L 23/05
401/132
6,508,602 B1 1/2003 Gruenbacher
(Continued)

FOREIGN PATENT DOCUMENTS

EP 0 078 596 A1 8/1982
JP 05063453 U 8/1993
(Continued)

OTHER PUBLICATIONS

European Supplementary Partial Search Report, for co-pending European Patent Application No. 14751042; dated Feb. 15, 2017; 3 pages.

*Primary Examiner* — David Walczak
(74) *Attorney, Agent, or Firm* — Loza & Loza, LLP; Heidi L. Eisenhut

(57) ABSTRACT

A cleaning apparatus for a mobile device. The cleaning apparatus comprises: a support plate; a sealing layer attached under the support plate; and a wiping layer disposed under the sealing layer, wherein a cleaning solution receiving part for receiving cleaning solution is formed between the support plate and the sealing layer, the sealing layer has a through hole extending to the wiping layer, and the cleaning solution is discharged to the wiping layer through the through hole.

16 Claims, 30 Drawing Sheets

(30) Foreign Application Priority Data

| Apr. 11, 2013 | (KR) | ........................ 10-2013-0040134 |
| Apr. 15, 2013 | (KR) | ........................ 10-2013-0041172 |
| Apr. 16, 2013 | (KR) | ........................ 10-2013-0041854 |
| Apr. 16, 2013 | (KR) | ........................ 10-2013-0041859 |
| May 22, 2013 | (KR) | ........................ 10-2013-0057962 |
| Oct. 30, 2013 | (KR) | ........................ 10-2013-0129826 |

(51) Int. Cl.

| *B32B 15/08* | (2006.01) |
| *A47L 25/00* | (2006.01) |
| *B32B 7/02* | (2006.01) |
| *B32B 15/20* | (2006.01) |
| *B32B 27/08* | (2006.01) |
| *B32B 27/10* | (2006.01) |
| *B32B 27/30* | (2006.01) |
| *B32B 27/36* | (2006.01) |
| *B32B 3/02* | (2006.01) |

(52) U.S. Cl.
CPC ................ *B32B 7/12* (2013.01); *B32B 15/08* (2013.01); *B32B 15/20* (2013.01); *B32B 27/08* (2013.01); *B32B 27/10* (2013.01); *B32B 27/304* (2013.01); *B32B 27/36* (2013.01); *B32B 27/365* (2013.01); *B32B 2307/51* (2013.01); *B32B 2432/00* (2013.01)

(56) References Cited

U.S. PATENT DOCUMENTS

| 6,508,604 | B1 | 1/2003 | Bechmann et al. |
| 6,536,974 | B2 * | 3/2003 | Redmond ............. A45D 34/04 |
| | | | 401/132 |
| 7,416,358 | B2 * | 8/2008 | Legendre ............... A45D 40/26 |
| | | | 401/133 |

FOREIGN PATENT DOCUMENTS

| JP | 09234170 A | 9/1997 |
| JP | 2002-253443 A | 9/2002 |
| JP | 2004-105710 A | 4/2004 |
| JP | 2008-523233 A | 7/2008 |
| KR | 20-0319776 Y1 | 7/2003 |
| KR | 20-0327728 Y1 | 9/2003 |
| KR | 10-0391751 B1 | 11/2003 |
| KR | 20-0383400 Y1 | 4/2005 |
| KR | 20-0415702 Y1 | 5/2006 |
| KR | 20-0421547 Y1 | 7/2006 |
| KR | 20-0424183 Y1 | 8/2006 |
| KR | 20-0426083 Y1 | 9/2006 |
| KR | 10-2008-0042099 A | 5/2008 |
| KR | 10-0887319 B1 | 3/2009 |
| KR | 20-2009-0011958 U | 11/2009 |
| KR | 10-2013-0030384 A | 3/2013 |

\* cited by examiner

[Fig. 1]
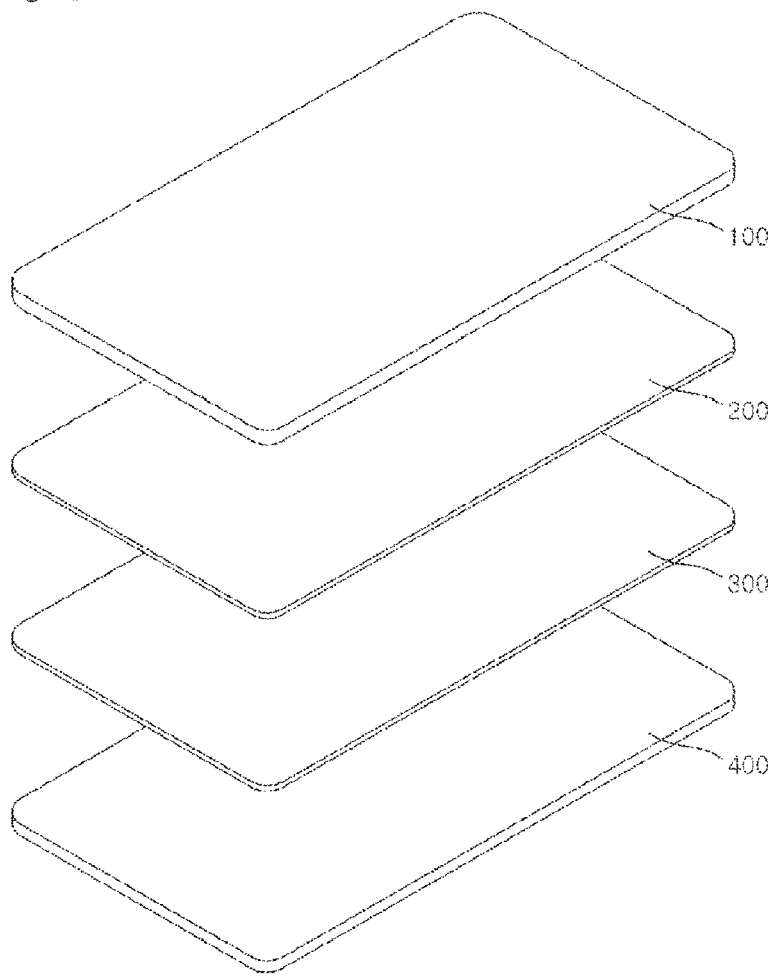
[Fig. 2]
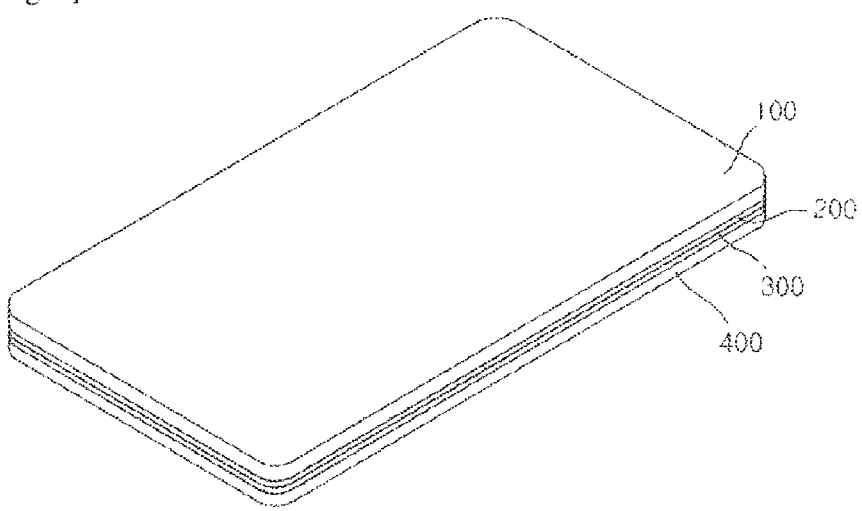

[Fig. 3]
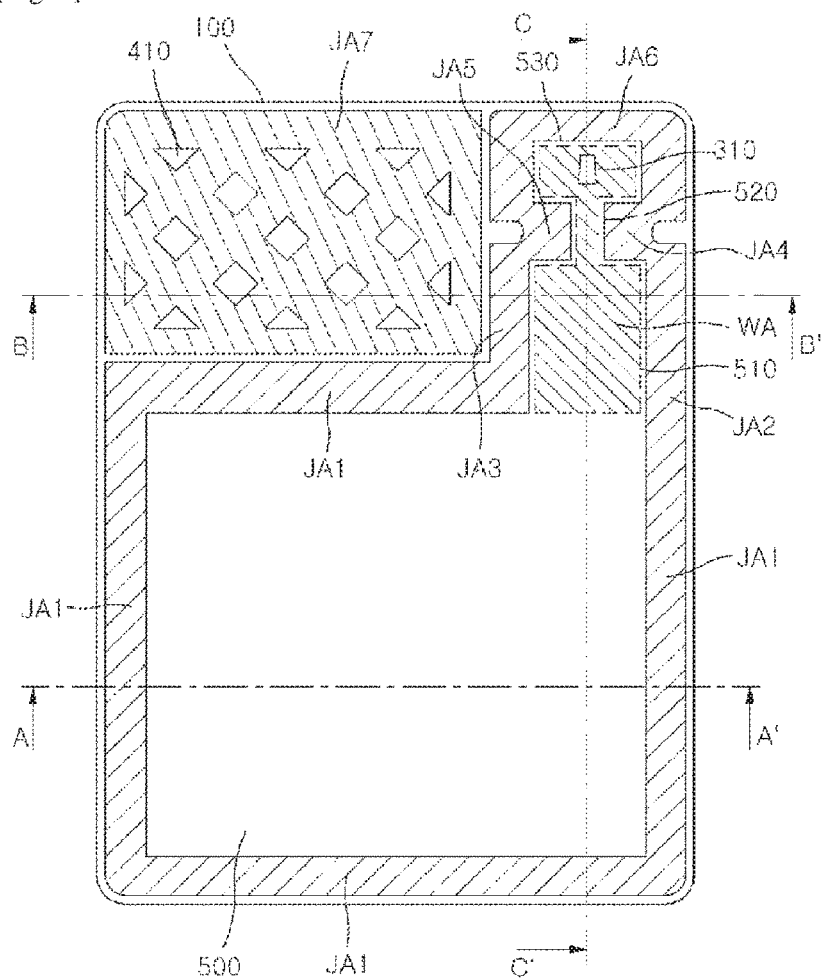
[Fig. 4]
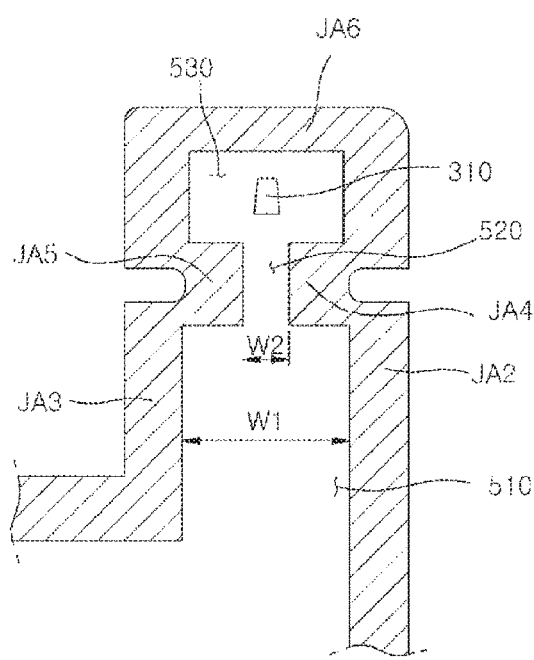

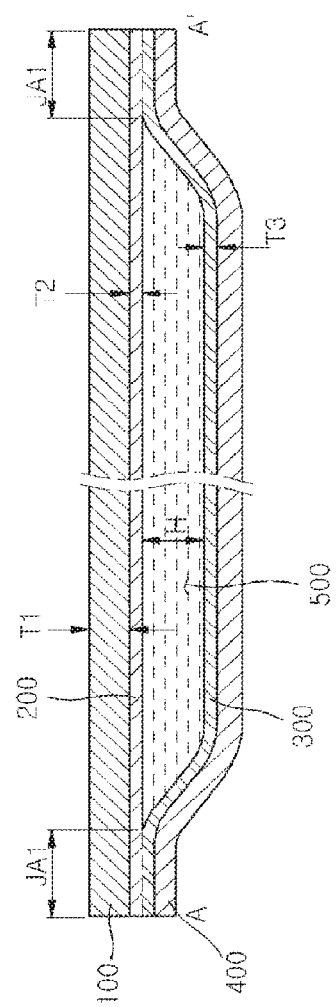

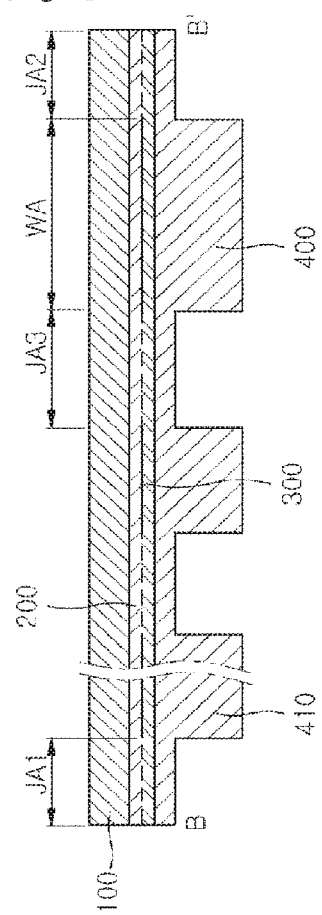

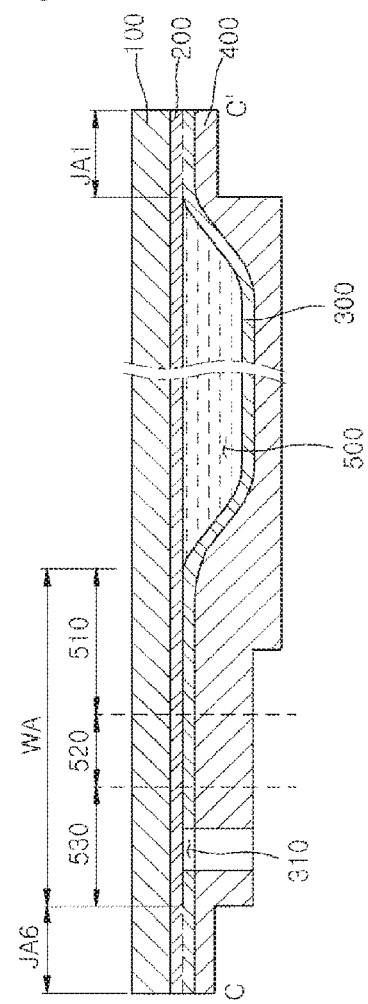

[Fig. 8]
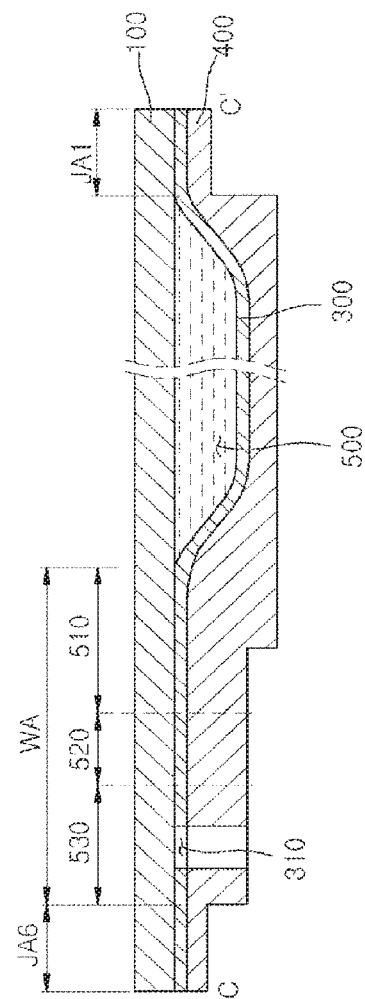
[Fig. 9]
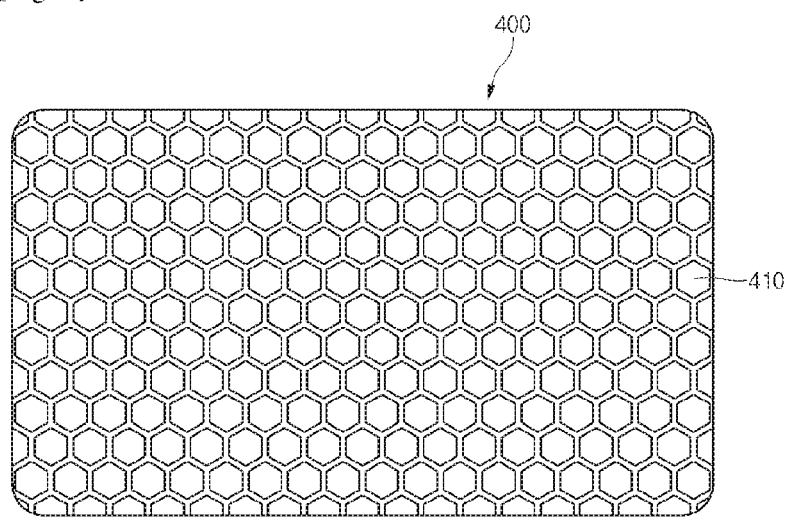

[Fig. 10]
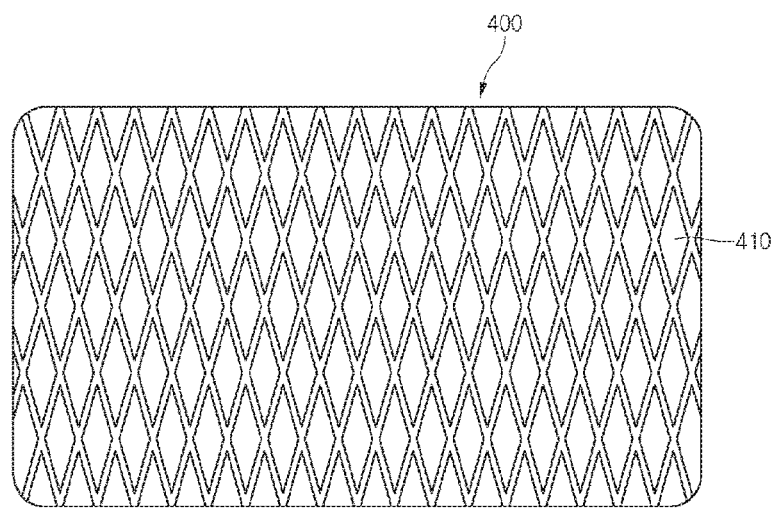
[Fig. 11]
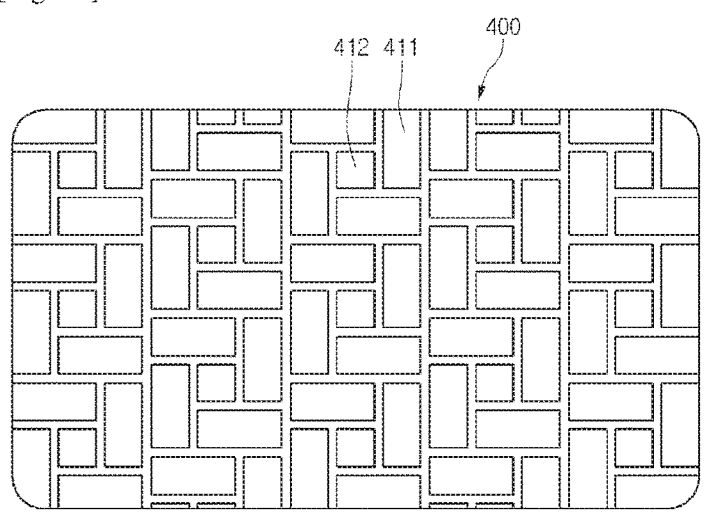
[Fig. 12]
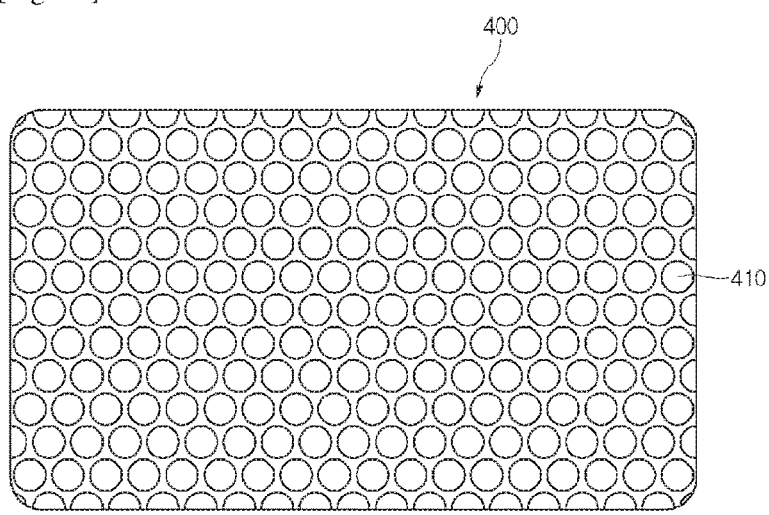

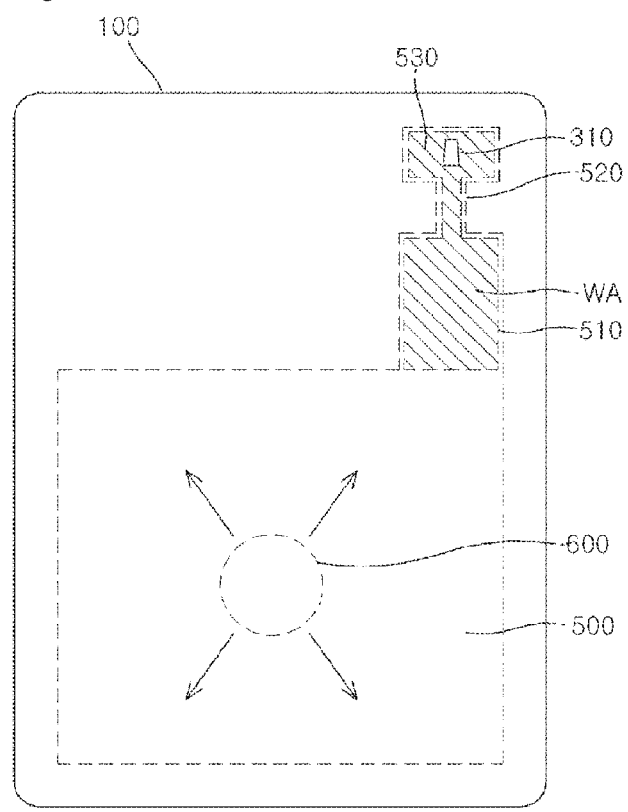
[Fig. 13]

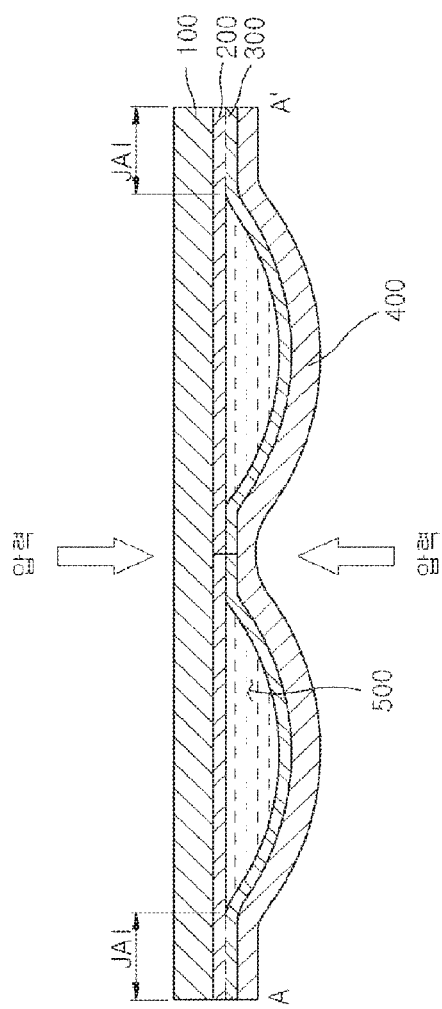

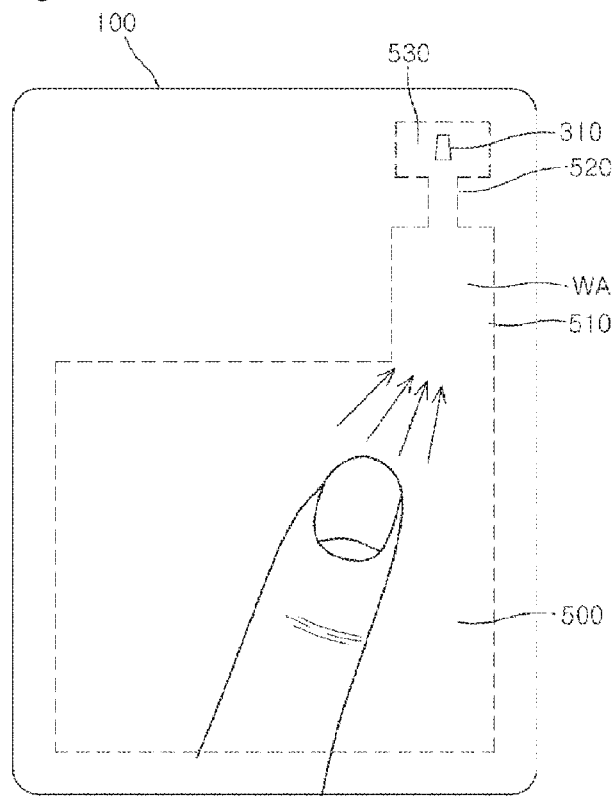
[Fig. 15]

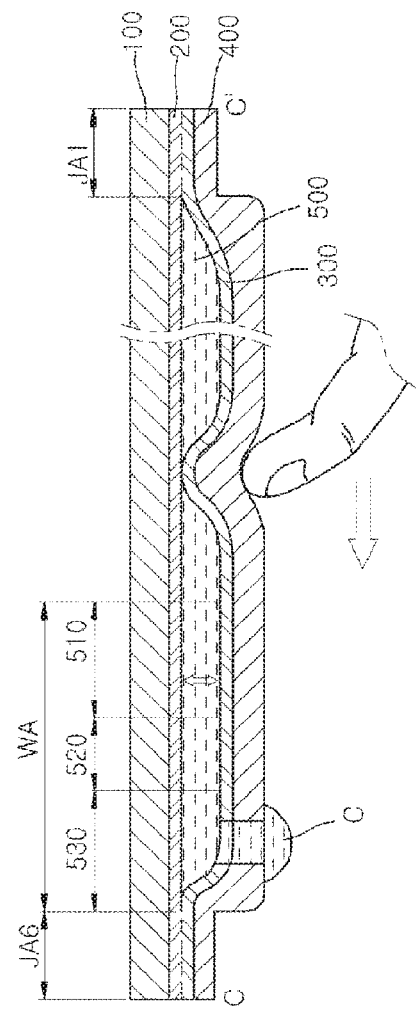
[Fig. 16]

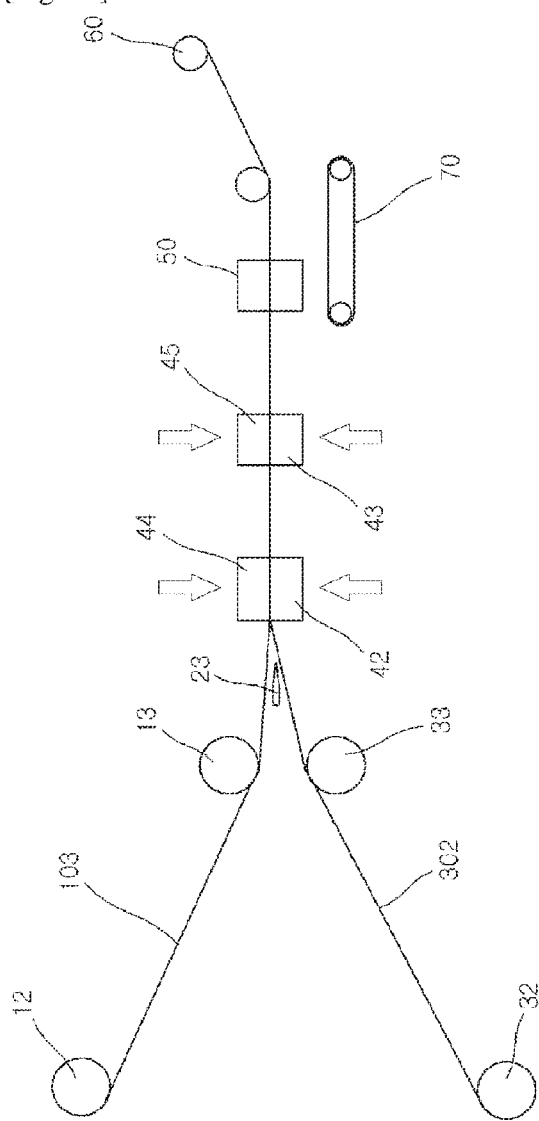

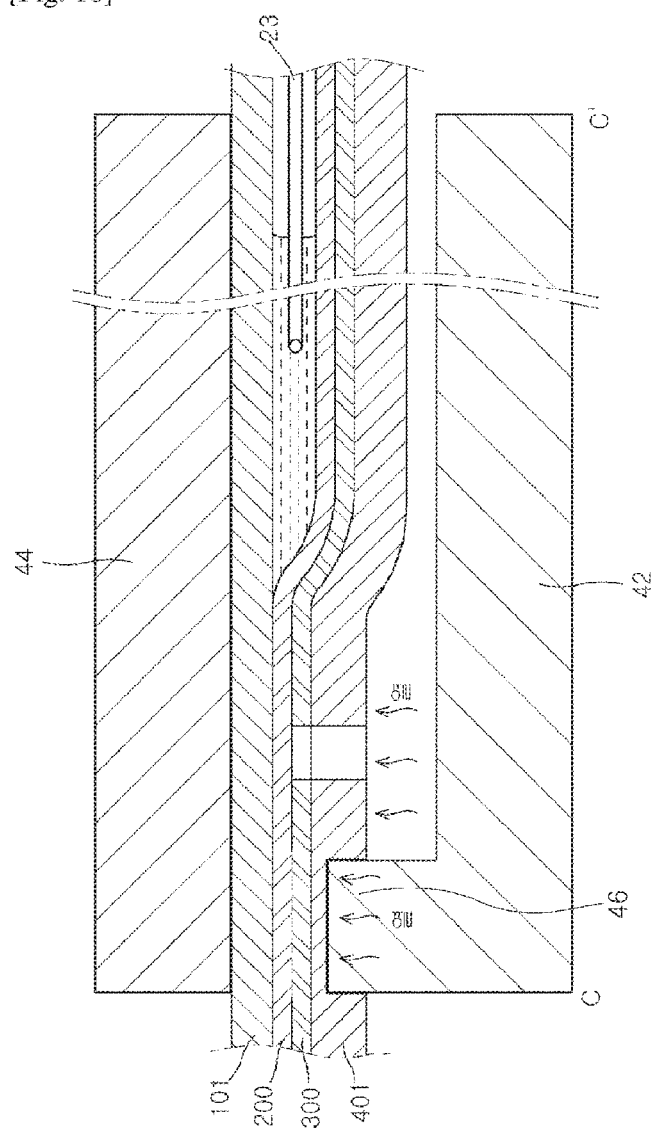
[Fig. 18]

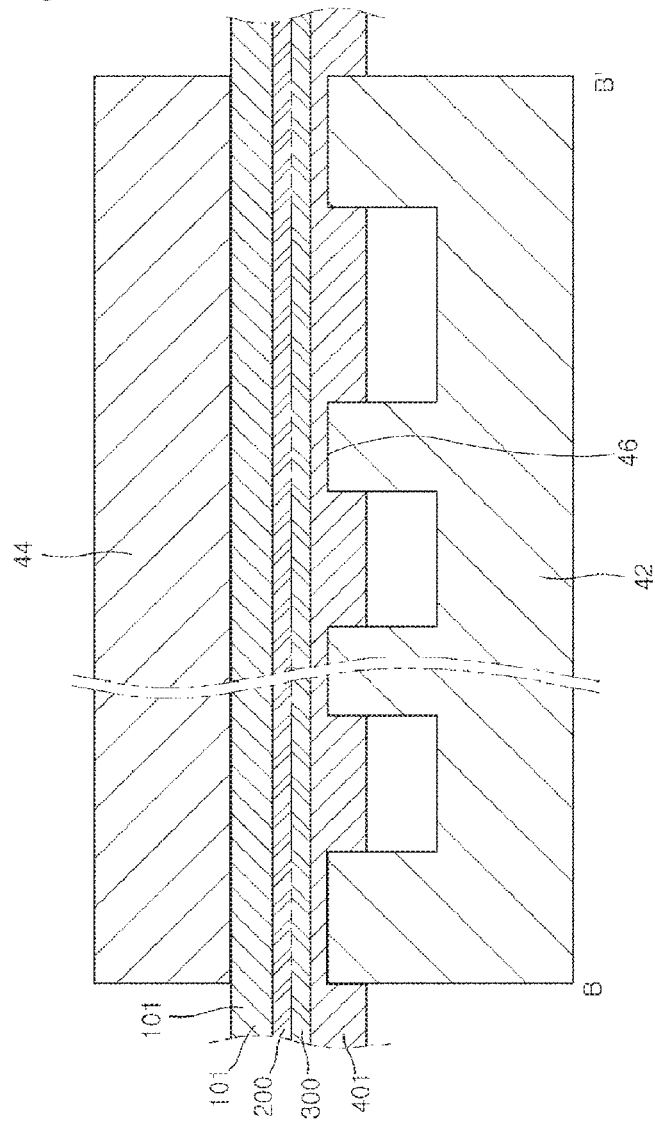
[Fig. 19]

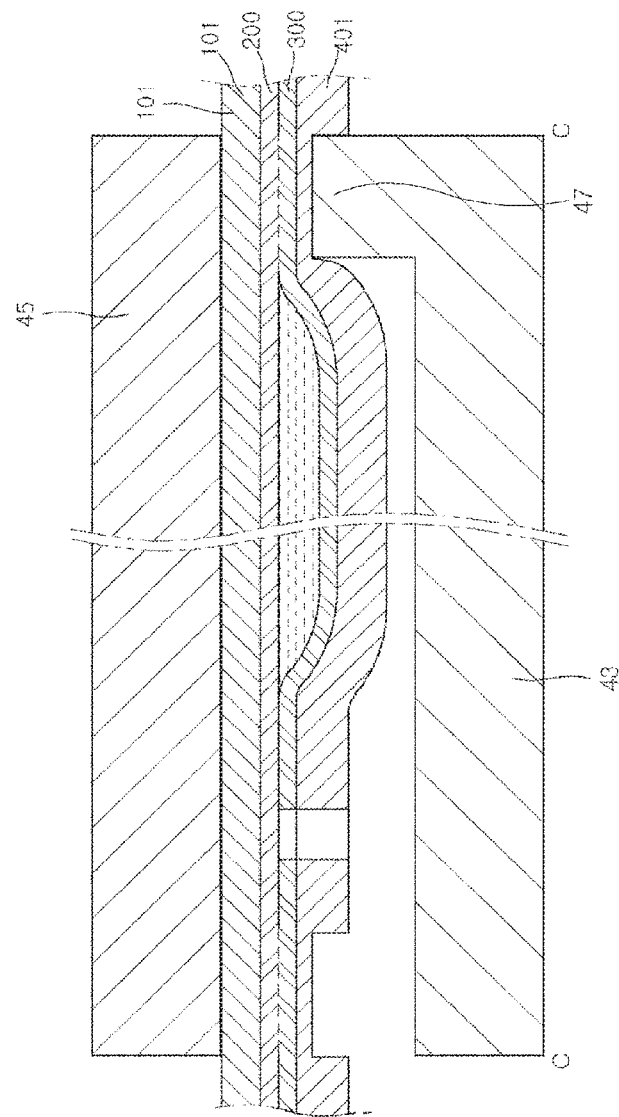
[Fig. 20]

[Fig. 21]
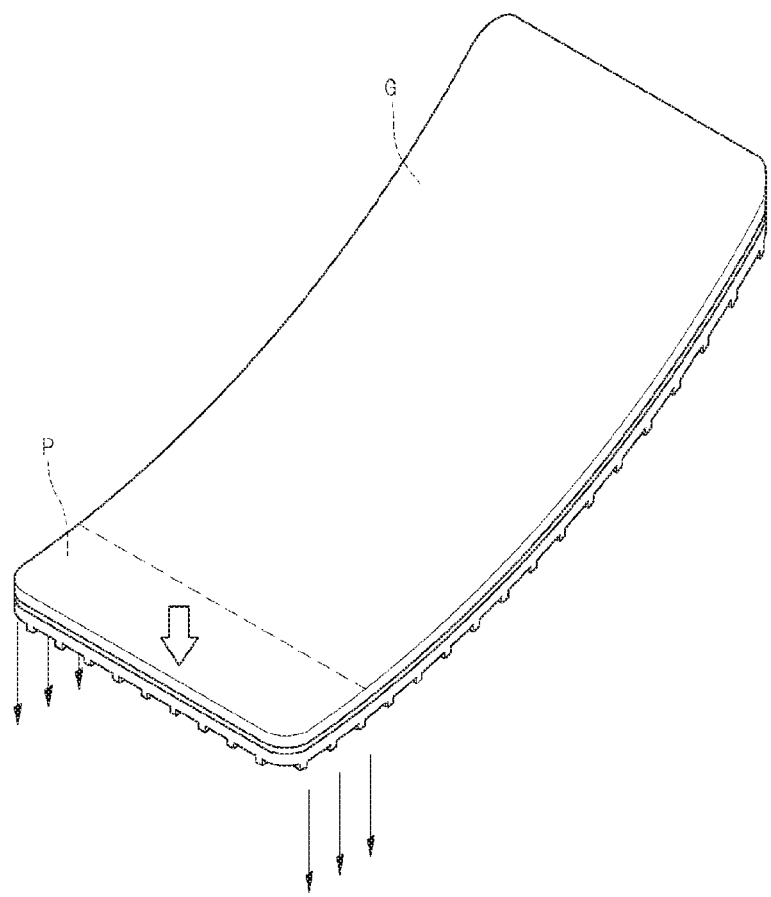
[Fig. 22]
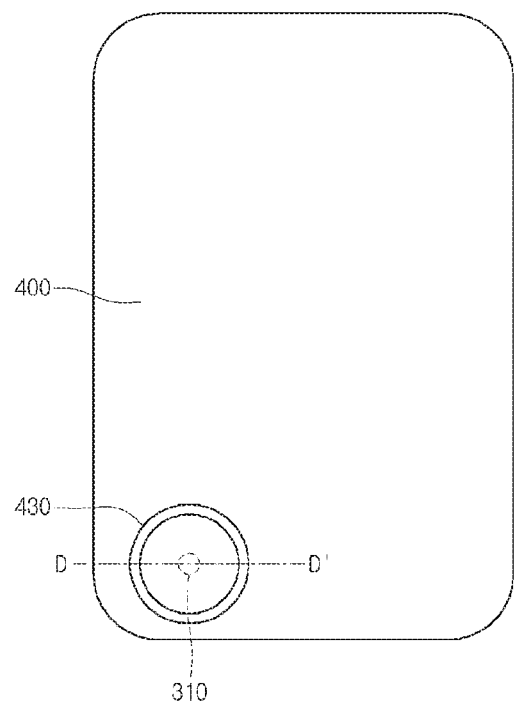

[Fig. 23]
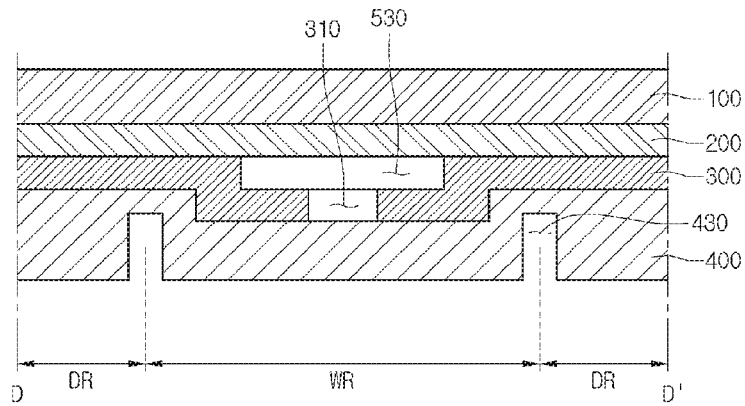
[Fig. 24]
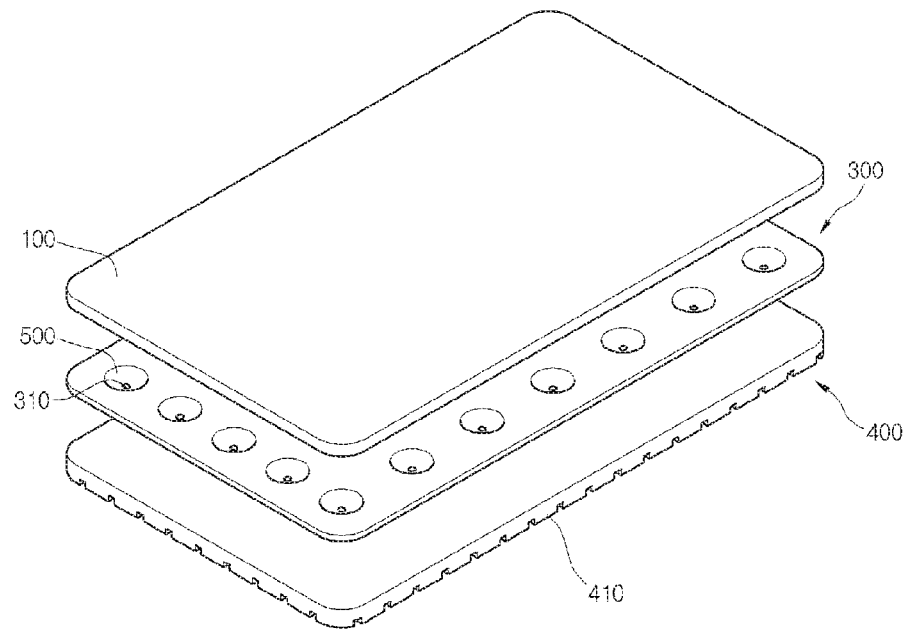
[Fig. 25]
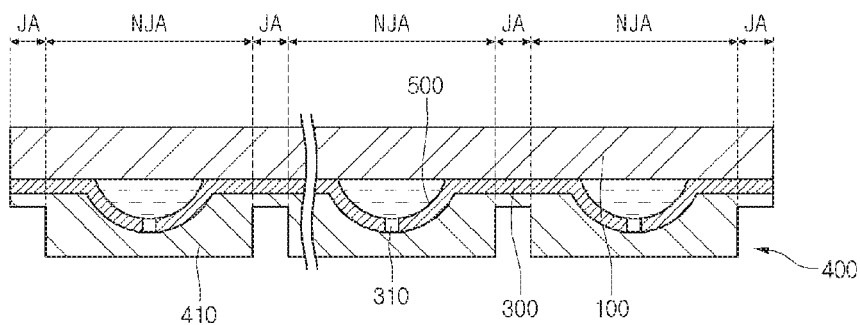

[Fig. 26]
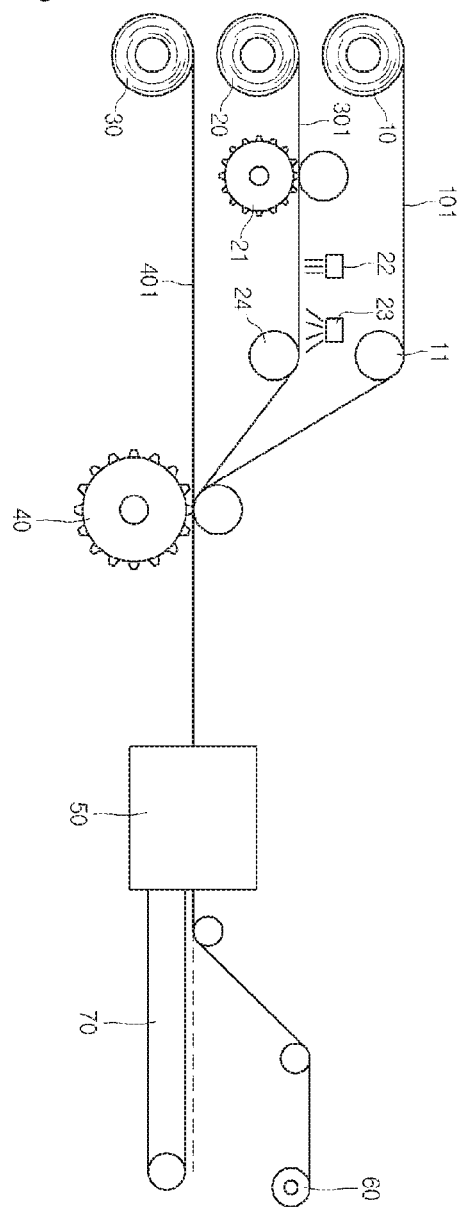
[Fig. 27]
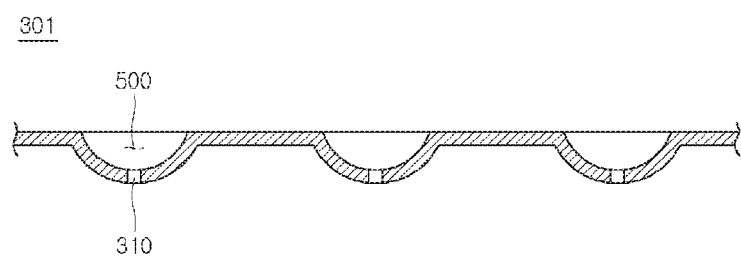

[Fig. 28]
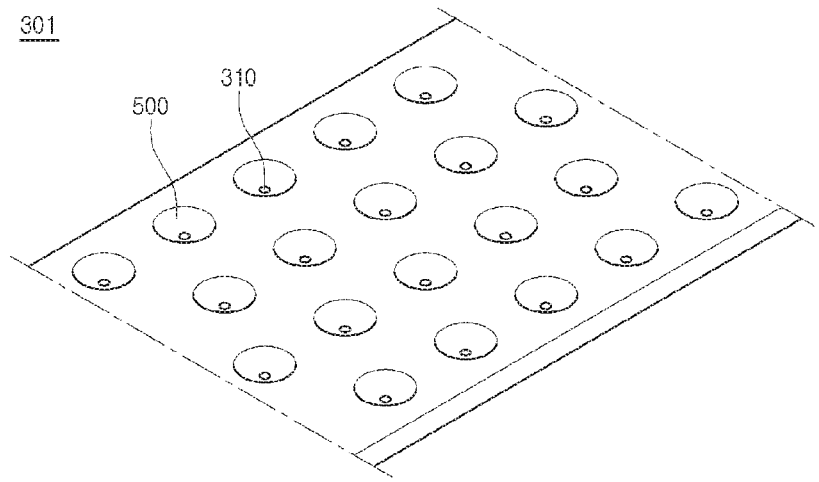
[Fig. 29]
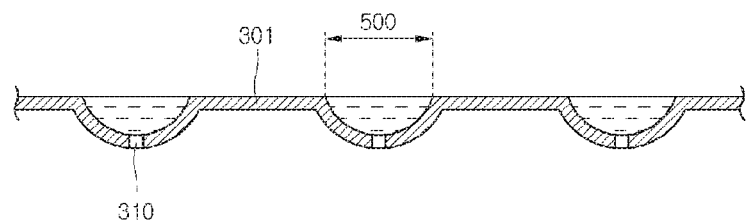
[Fig. 30]
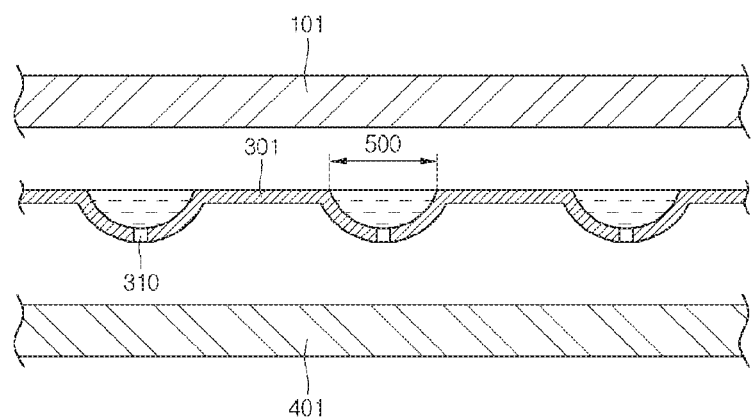

[Fig. 31]
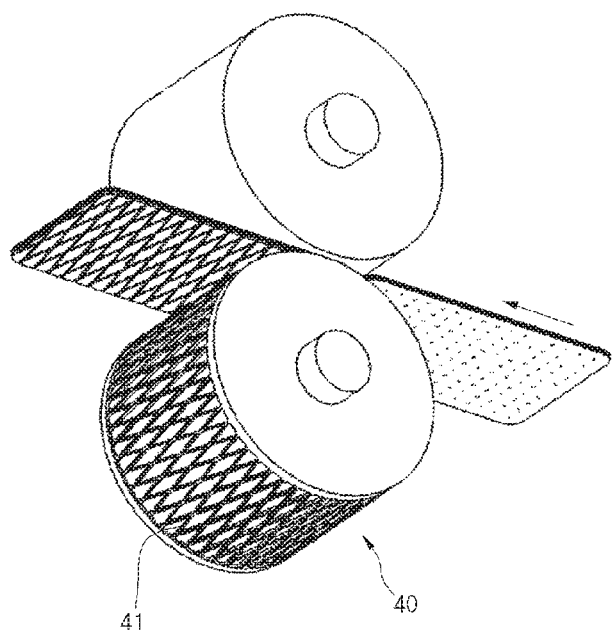
[Fig. 32]
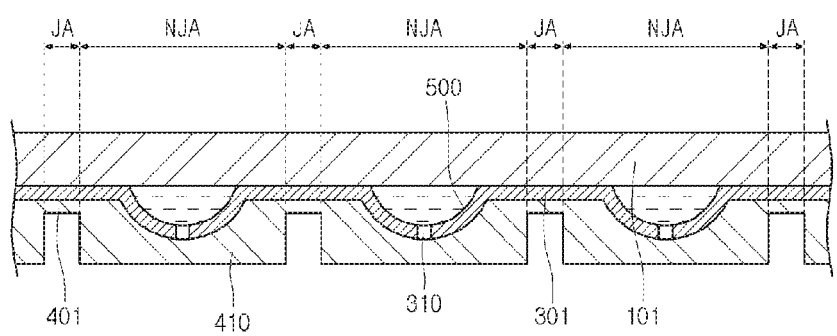

[Fig. 33]
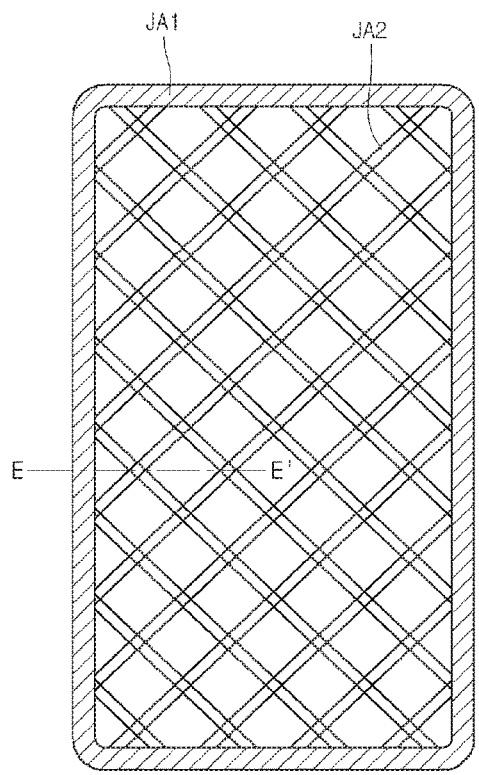
[Fig. 34]
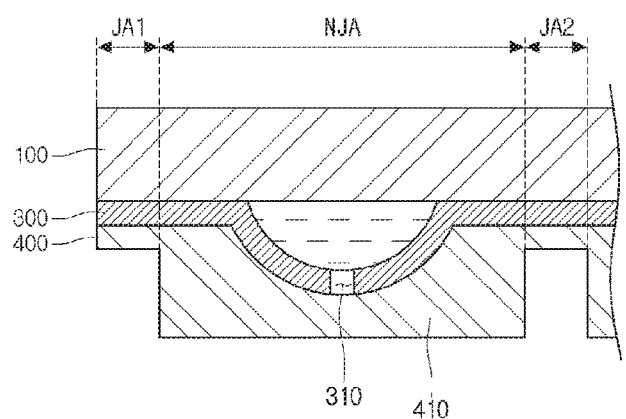
[Fig. 35]
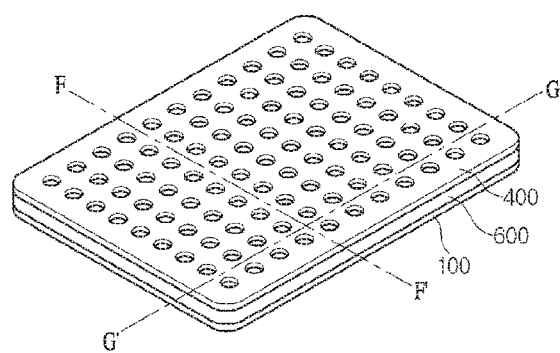

[Fig. 36]
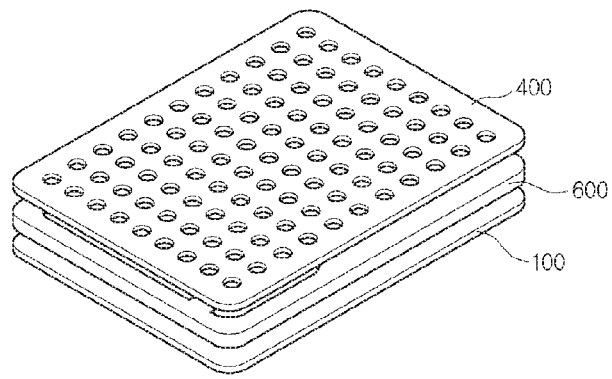
[Fig. 37]
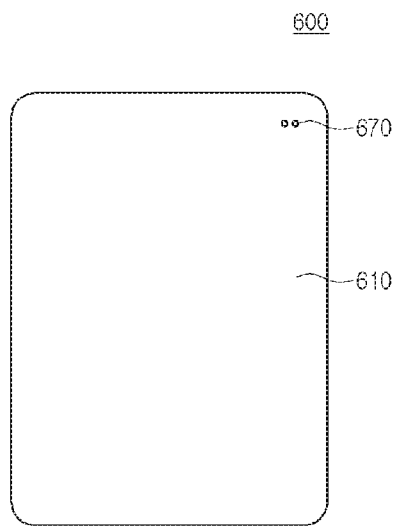
[Fig. 38]
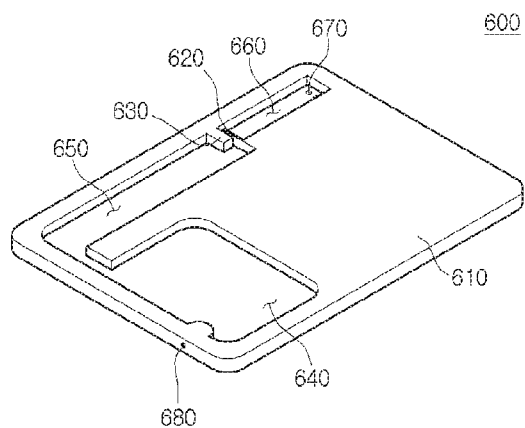

[Fig. 39]
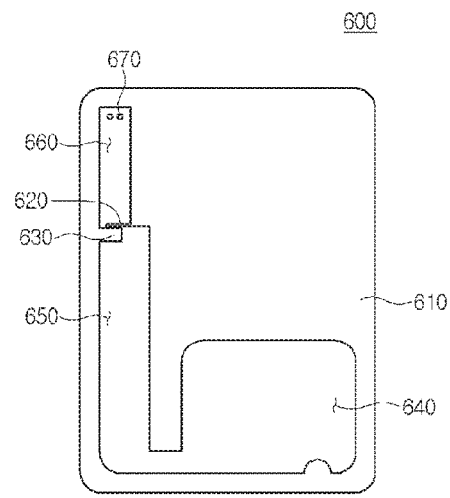
[Fig. 40]
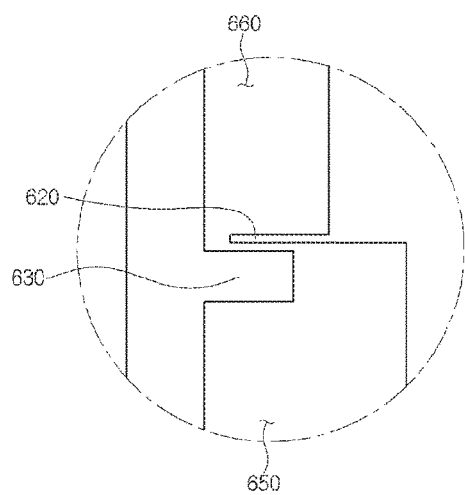
[Fig. 41]
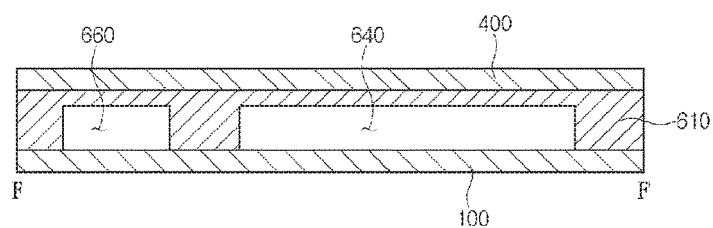
[Fig. 42]
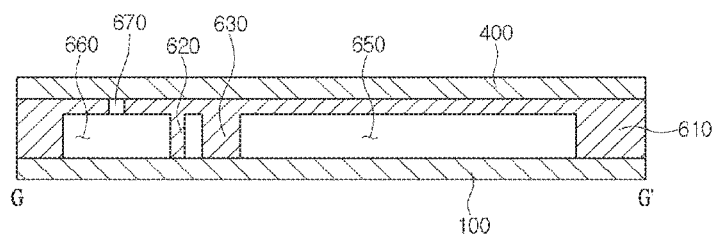

[Fig. 43]
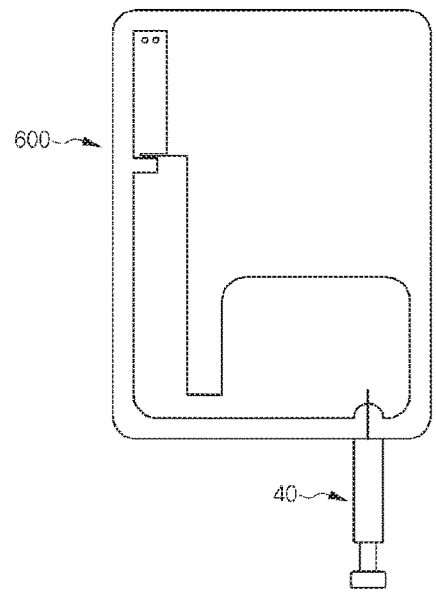
[Fig. 44]
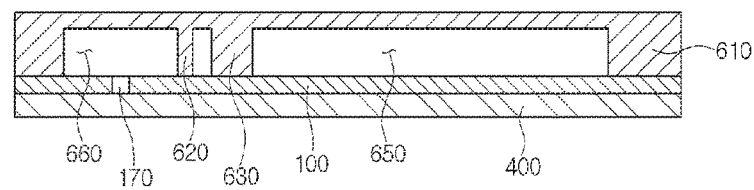
[Fig. 45]
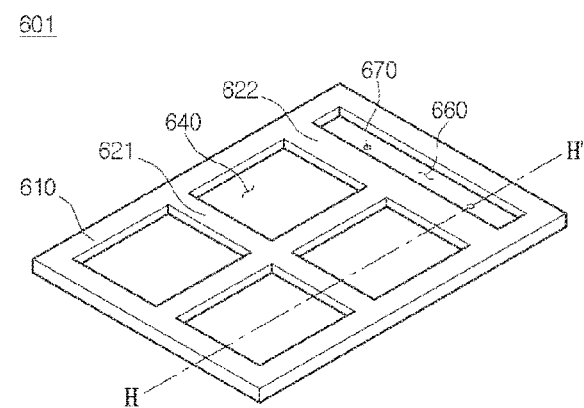
[Fig. 46]
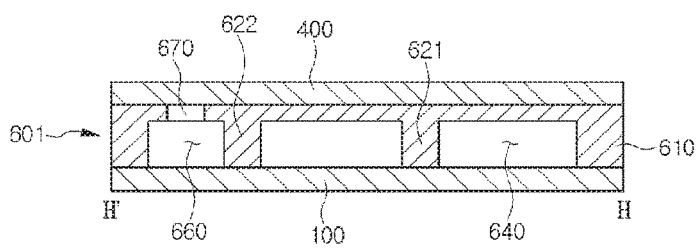

[Fig. 47]
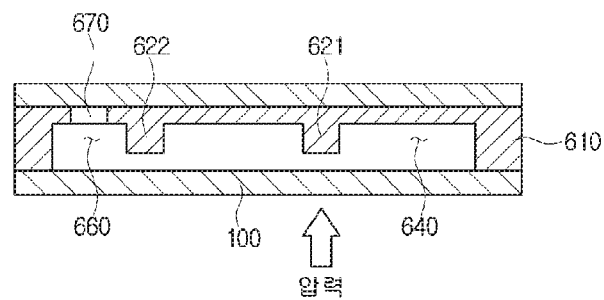
압력
[Fig. 48]
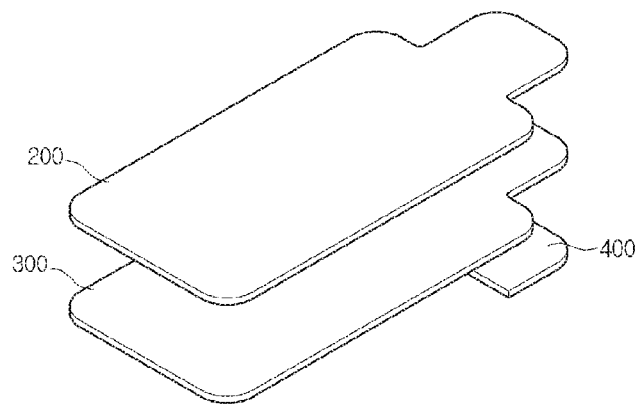
[Fig. 49]
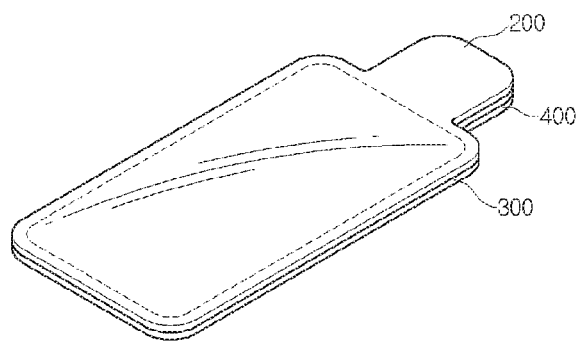

[Fig. 50]
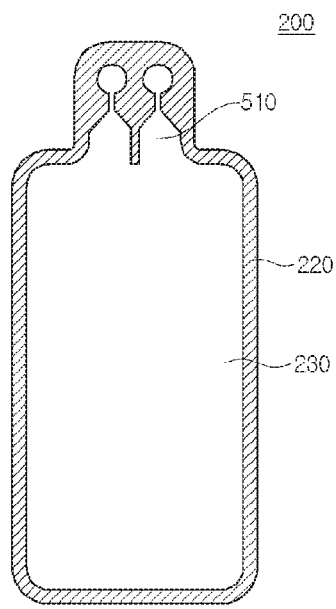
[Fig. 51]
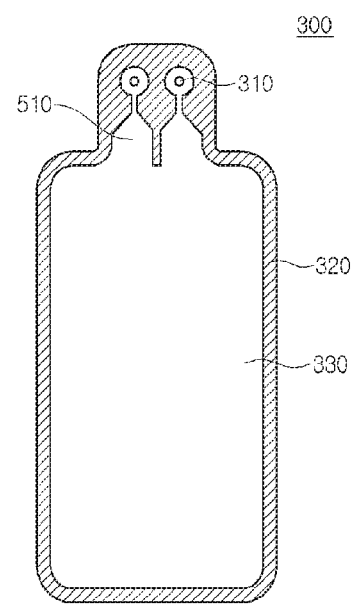

[Fig. 52]
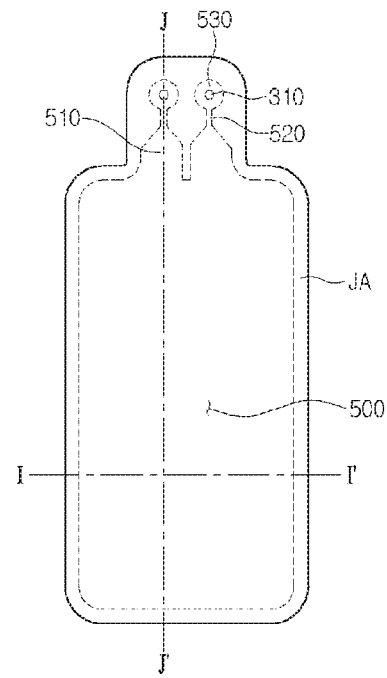
[Fig. 53]
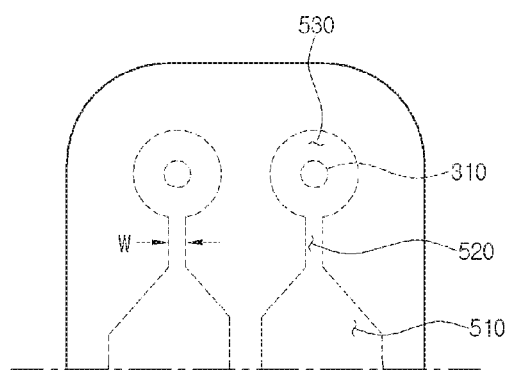
[Fig. 54]
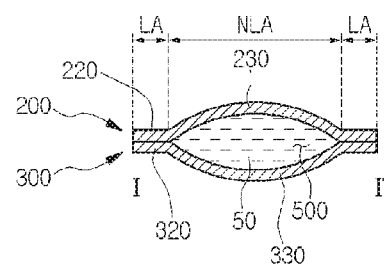

[Fig. 55]
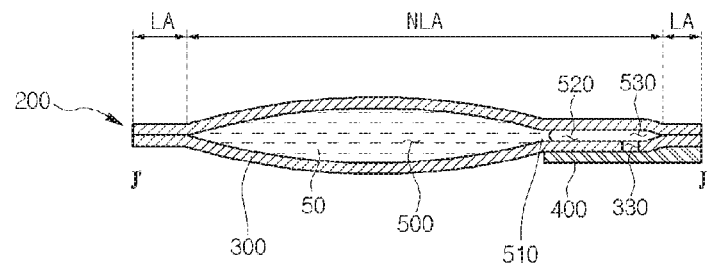
[Fig. 56]
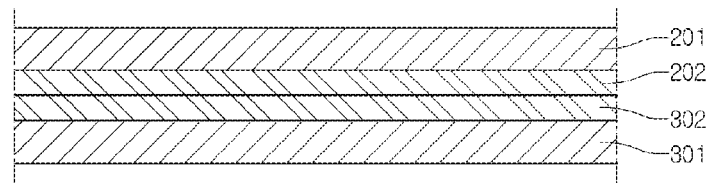
[Fig. 57]
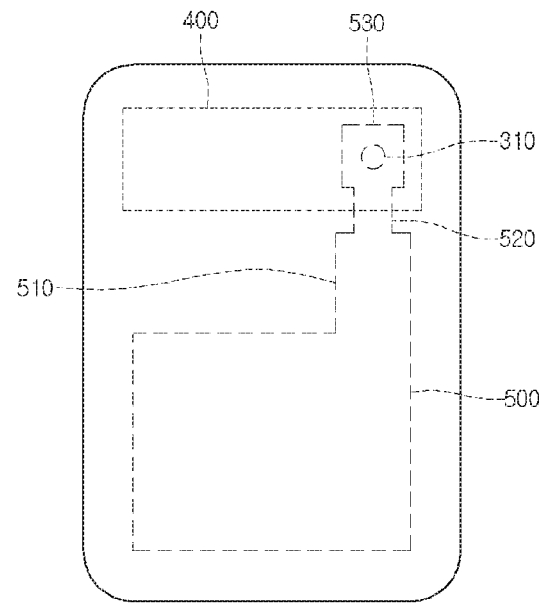

[Fig. 58]
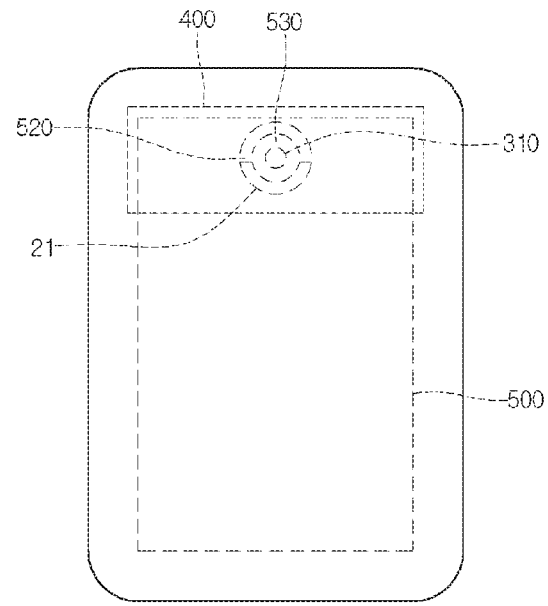
[Fig. 59]
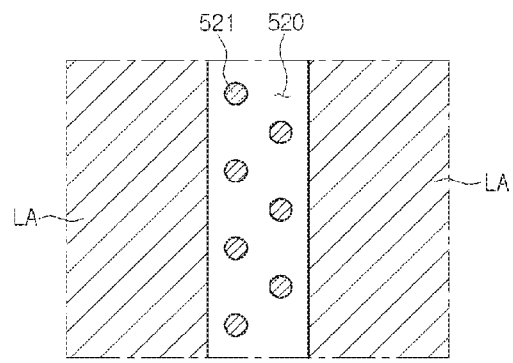
[Fig. 60]
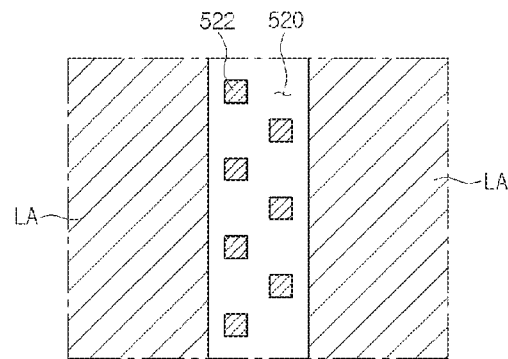

[Fig. 61]
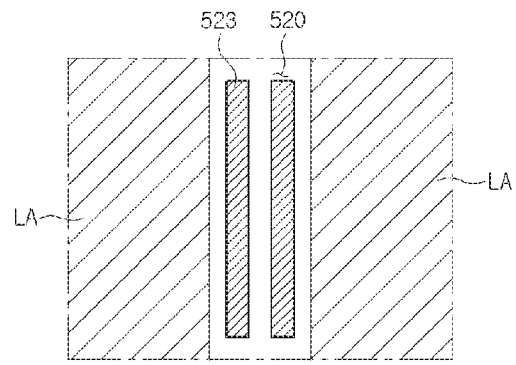
[Fig. 62]
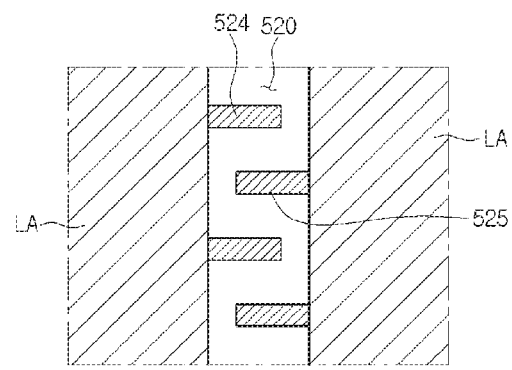
[Fig. 63]
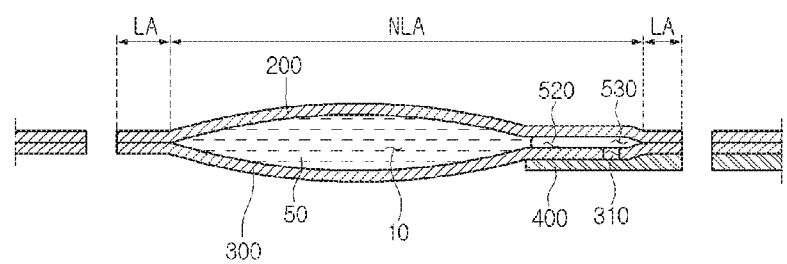

CLEANING APPARATUS FOR MOBILE DEVICE

TECHNICAL FIELD

The present invention relates to an apparatus for cleaning a mobile device.

BACKGROUND ART

Smart phone users increase as cellular phones have been provided, the resolution performance of screens becomes improved as the definition of smart phones has developed from a high definition (HD) level to a full HD level.

However, display screens of smart phones are easily polluted by foreign substances due to users, which disturbs users in their watching clear images.

Since display panels of smart phones have a weak surface strength, to prevent scratches and to tidily wipe contaminants, it is necessary to wipe them with very soft wipers or tissues.

DISCLOSURE OF THE INVENTION
TECHNICAL PROBLEM

The present invention provides an apparatus capable of effectively cleaning a mobile device.

Technical Solution

A cleaning apparatus for a mobile device according to one embodiment includes a supporting plate, a sealing layer joined below the supporting plate, and a wiping layer disposed below the sealing layer, in which a cleaning solution accommodating portion which contains a cleaning solution is formed between the supporting plate and the sealing layer, the sealing layer includes a through hole which extends to the wiping layer, and the cleaning solution is ejected to the wiping layer through the through hole.

The sealing layer may include a through hole for ejecting the cleaning solution to the wiping layer, an average height of the cleaning solution accommodating portion may be from 0.5 mm to 2 mm, and a viscosity of the cleaning solution may be from about 10 cps to about 1000 cps.

A cleaning apparatus for a mobile device according to one embodiment includes a first sealing layer, a second sealing layer disposed below the first sealing layer, and a wiping layer attached to the second sealing layer, in which a cleaning solution accommodating portion is formed between the first sealing layer and the second sealing layer, the second sealing layer includes a through hole through which a cleaning solution contained in the cleaning solution accommodating portion is ejected to the wiping layer, a second joint portion and a third joint portion are formed by mutually joining the first sealing layer and the second sealing layer, an ejection pressure applying portion which extends from the cleaning solution accommodating portion to the through hole is formed between the second joint portion and the third joint portion, a width of the ejection pressure applying portion is from 0.5 cm to 3 cm, a length of the ejection pressure applying portion is from 0.5 cm to 5 cm, the first sealing layer and the second sealing layer are in contact with or stuck to each other to form a temporary shutoff portion at the ejection pressure applying portion, and the temporary shutoff portion temporarily shuts off a movement of the cleaning solution from the cleaning solution accommodating portion to the through hole.

A cleaning apparatus for a mobile device according to one embodiment includes a first sealing layer, a second sealing layer disposed below the first sealing layer, and a wiping layer disposed below the second sealing layer, in which a joint portion is formed by directly or indirectly joining the first sealing layer to the second sealing layer, a cleaning solution accommodating portion which contains a cleaning solution is formed in an area surrounded by the joint portion between the first sealing layer and the second sealing layer, the second sealing layer includes a through hole for ejecting the cleaning solution to the wiping layer, an average height of the cleaning solution accommodating portion is from 0.05 mm to 2 mm, and a viscosity of the cleaning solution is from 10 cps to 1000 cps.

A cleaning apparatus for a mobile device according to one embodiment includes a cleaning solution accommodating body which includes a cleaning solution accommodating portion formed as a groove shape, a cover portion which covers the cleaning solution accommodating portion, and a wiping layer disposed adjacently to one of the cleaning solution accommodating body and the cover portion, in which a cleaning solution is contained in the cleaning solution accommodating portion and the cleaning solution contained in the cleaning solution accommodating portion is ejected to the wiping layer.

Advantageous Effects

Accordingly, since having the plate shape, and more particularly, the card shape, the cleaning apparatus for the mobile device according to the present embodiment may be easily carried in a pocket of a cellular phone case, a wallet, a handbag, or a pocket. While being carried, unintentional pressure may be applied to the cleaning apparatus. Here, since a cleaning portion generally has a flat shape, when external pressure is applied, pressure inside a cleaning solution accommodating portion is dispersed. Accordingly, a cleaning solution is not ejected through a through hole from the cleaning solution accommodating portion due to the unintentional external pressure.

Also, the cleaning solution has a high viscosity, it is possible to prevent the cleaning solution from being ejected along a flow channel which extends from the cleaning solution accommodating portion to the through hole due to a capillary phenomenon at nonpressure. Accordingly, the cleaning apparatus for the mobile device may prevent the cleaning solution from being unintentionally ejected.

Also, the cleaning apparatus for the mobile device according to the present embodiment may clean the mobile device by ejecting the cleaning solution at any time preferred by the user. That is, before the user ejects the cleaning solution, the cleaning solution may not be ejected outward. Since the cleaning apparatus for the mobile device ejects the cleaning solution only when the user wants, it is possible to prevent the wallet or pocket and the like from being polluted by undesirable ejection of the cleaning solution while storing the cleaning apparatus. That is, the cleaning apparatus for the mobile device may maximize portability necessary for cleaning the mobile device by preventing the ejection of the cleaning solution which may occur while being carried.

Also, the cleaning apparatus for the mobile device according to the present embodiment may prevent the cleaning solution inside the cleaning solution accommodating portion from being unintentionally ejected while being carried using a temporary shutoff portion. Also, since the temporary shutoff portion seals the cleaning solution accommodating portion, it is possible to prevent the cleaning solution in the cleaning solution accommodating portion from evaporating. Accordingly, the cleaning apparatus for the mobile device may be used for a long time without a reduction of the cleaning solution.

Also, the cleaning apparatus for the mobile device according to the present embodiment may restrain the evaporation of the cleaning solution and may increase a recyclable number.

Also, since a supporting plate of the cleaning apparatus for the mobile device according to the present embodiment has relatively high flexural elasticity, pressure is transferred to a part not pushed by a finger in such a way that the cleaning apparatus for the mobile device may wipe the mobile device using generally regular pressure. Also, since the cleaning solution accommodating portion has an overall flat shape, a wiping layer may be in even contact with the mobile device and in contact with a larger area to maximize a cleaning effect.

Particularly, the supporting plate has elasticity and simultaneously supports the sealing layer and the wiping layer. Accordingly, when the mobile device is cleaned by the user, the cleaning apparatus according to the embodiment may evenly apply pressure the entire screen of the mobile device while being bent to a certain degree. Also, the cleaning apparatus according to the embodiment restores to a flat shape when an external force is not present after wiping the mobile device.

Accordingly, the cleaning apparatus according to the embodiment may effectively clean the mobile device.

BRIEF DESCRIPTION OF THE DRAWINGS

FIG. 1 is an exploded perspective view of a cleaning apparatus for a mobile device according to one embodiment of the present invention.

FIG. 2 is a perspective view of the cleaning apparatus for the mobile device in FIG. 1.

FIG. 3 is a top view of the cleaning apparatus for the mobile device in FIG. 1.

FIG. 4 is an enlarged top view of an ejection pressure applying portion, a flow control line, and a temporary storage portion of the cleaning apparatus for the mobile device in FIG. 1.

FIG. 5 is a cross-sectional view of a part taken along line A-A' shown in FIG. 3.

FIG. 6 is a cross-sectional view of a part taken along line B-B' shown in FIG. 3.

FIG. 7 is a cross-sectional view of a part taken along line C-C' shown in FIG. 3.

FIG. 8 is a cross-sectional view illustrating a modified example of the cleaning apparatus for the mobile device in FIG. 1.

FIGS. 9 to 12 are views illustrating pattern areas of a wiping layer.

FIGS. 13 and 14 are views illustrating a process of dispersing external pressure applied to the cleaning apparatus for the mobile device in FIG. 1.

FIGS. 15 and 16 are views illustrating a process of ejecting a cleaning solution from the cleaning apparatus for the mobile device in FIG. 1.

FIG. 17 is a view of an apparatus for manufacturing the cleaning apparatus for the mobile device in FIG. 1.

FIGS. 18 to 20 are views illustrating a process of manufacturing the cleaning apparatus for the mobile device in FIG. 1.

FIG. 21 is a view illustrating a process of using the cleaning apparatus for the mobile device according to one embodiment of the present invention.

FIG. 22 is a top view of a wiping layer of a cleaning apparatus according to another embodiment.

FIG. 23 is a cross-sectional view of a part taken along line D-D' shown in FIG. 22.

FIG. 24 is an exploded perspective view of a cleaning apparatus according to still another embodiment.

FIG. 25 is a cross-sectional view of the cleaning apparatus according to the present embodiment.

FIG. 26 is a view of an apparatus for manufacturing the cleaning apparatus of FIGS. 24 and 25.

FIGS. 27 to 32 are views illustrating a process of manufacturing the cleaning apparatus according to the present embodiment.

FIG. 33 is a top view of a cleaning apparatus for a mobile device according to yet another embodiment.

FIG. 34 is a cross-sectional view of a part taken along line E-E' shown in FIG. 33.

FIG. 35 is a perspective view of the cleaning apparatus according to an embodiment.

FIG. 36 is an exploded perspective view of the cleaning apparatus according to the embodiment.

FIG. 37 is a top view illustrating a top surface of a cleaning solution accommodating portion.

FIG. 38 is a perspective view illustrating a bottom surface of the cleaning solution accommodating portion.

FIG. 39 is a top view illustrating the bottom surface of the cleaning solution accommodating portion.

FIG. 40 is an enlarged view illustrating a part of the bottom surface of the cleaning solution accommodating portion.

FIG. 41 is a cross-sectional view of a part taken along line F-F' shown in FIG. 35.

FIG. 42 is a cross-sectional view of a part taken along line G-G' shown in FIG. 35.

FIG. 43 is a view illustrating a process of injecting a cleaning solution into the cleaning apparatus according to the embodiment.

FIG. 44 is a cross-sectional view of a cleaning apparatus according to even another embodiment.

FIG. 45 is a perspective view illustrating a bottom surface of a cleaning solution accommodating body according to a further embodiment.

FIG. 46 is a cross-sectional view of a part taken along line H-H' shown in FIG. 45.

FIG. 47 is a cross-sectional view illustrating a state of applying pressure to a cleaning apparatus according to another embodiment.

FIG. 48 is an exploded perspective view of a cleaning apparatus according to a still further embodiment.

FIG. 49 is a perspective view of the cleaning apparatus for a mobile device according to the present embodiment.

FIG. 50 is a top view illustrating a bottom surface of a first sealing portion.

FIG. 51 is a top view illustrating a top surface of a second sealing portion.

FIG. 52 is a top view illustrating a joint area and a non-joint area.

FIG. 53 is an enlarged top view of a flow control line and a sub cleaning solution accommodating portion.

FIG. 54 is a cross-sectional view of a part taken along line I-I' shown in FIG. 52.

FIG. 55 is a cross-sectional view of a part taken along line J-J' shown in FIG. 52.

FIG. 56 is a detailed view of the first sealing portion and the second sealing portion in the joint area.

FIG. 57 is a top view of a cleaning apparatus for a mobile device according to a yet further embodiment.

FIG. 58 is a top view of a cleaning apparatus for a mobile device according to an even further embodiment.

FIG. 59 is a top view of a flow control line according to another embodiment.

FIG. 60 is a top view of a flow control line according to still another embodiment.

FIG. 61 is a top view of a flow control line according to yet another embodiment.

FIG. 62 is a top view of a flow control line according to even another embodiment.

FIG. 63 is a view illustrating a process of manufacturing the cleaning apparatus for the mobile device according to the present embodiment.

MODE FOR CARRYING OUT THE INVENTION

In a description for embodiments, it will be understood that when a plate, layer, or pattern is formed "on" or "under" another plate, layer, or pattern, it can be directly or indirectly "on" or "under" the other plate, layer, or pattern. That is, for example, one or more intervening plates, layers, or patterns may be present. Also, above and below of each component is described on the basis of the drawing. Sizes of respective components in the drawings may be exaggerated for description and do not mean actually applied sizes.

FIG. 1 is an exploded perspective view of a cleaning apparatus for a mobile device according to one embodiment of the present invention. FIG. 2 is a perspective view of the cleaning apparatus for the mobile device in FIG. 1. FIG. 3 is a top view of the cleaning apparatus for the mobile device in FIG. 1. FIG. 4 is an enlarged top view of an ejection pressure applying portion, a flow control line, and a temporary storage portion of the cleaning apparatus for the mobile device in FIG. 1. FIG. 5 is a cross-sectional view of a part taken along line A-A' shown in FIG. 3. FIG. 6 is a cross-sectional view of a part taken along line B-B' shown in FIG. 3. FIG. 7 is a cross-sectional view of a part taken along line C-C' shown in FIG. 3. FIG. 8 is a cross-sectional view illustrating a modified example of the cleaning apparatus for the mobile device in FIG. 1. FIGS. 9 to 12 are views illustrating pattern areas of a wiping layer. FIGS. 13 and 14 are views illustrating a process of dispersing external pressure applied to the cleaning apparatus for the mobile device in FIG. 1. FIGS. 15 and 16 are views illustrating a process of ejecting a cleaning solution from the cleaning apparatus for the mobile device in FIG. 1. FIG. 17 is a view of an apparatus for manufacturing the cleaning apparatus for the mobile device in FIG. 1. FIGS. 18 to 20 are views illustrating a process of manufacturing the cleaning apparatus for the mobile device in FIG. 1. FIG. 21 is a view illustrating a process of using the cleaning apparatus for the mobile device according to one embodiment of the present invention.

Referring to FIGS. 1 to 16, the cleaning apparatus for the mobile device according to the present embodiment includes a supporting plate 100, a first adhesive film 200, a second adhesive film 300, and a wiping layer 400.

The supporting plate 100 supports the first adhesive film 200, the second adhesive film 300, and the wiping layer 400. Compared with the first adhesive film 200, the second adhesive film 300, and the wiping layer 400, the supporting plate 100 has a highest elastic modulus. That is, an overall shape of the cleaning apparatus for the mobile device depends on the supporting plate 100. The supporting plate 100 has a plate shape.

The supporting plate 100 includes plastic. In more detail, the supporting plate 100 includes a plastic film. In more detail, the supporting plate 100 may be a film including one of a polypropylene resin, a polyethylene terephthalate resin, a polycarbonate resin, and a polyvinyl chloride-based resin.

Also, the supporting plate 100 may be a single layer of plastic. On the contrary, the supporting plate 100 may be a composite film including laminated several layers. For example, the supporting plate 100 may further include, in addition to the plastic layer, a paper layer, a metal layer such as an aluminum layer, or an inorganic compound layer. Also, the supporting plate 100 may further include a printing layer on which various types of information are displayed.

Since including plastic, the supporting plate 100 has elasticity. That is, when being formed of the material described above, the supporting plate 100 may have elasticity.

A thickness T1 of the supporting plate 100 may be from about 0.1 mm to about 1 mm. In more detail, the thickness of the supporting plate 100 may be from about 0.1 mm to about 0.5 mm. In more detail, the thickness of the supporting plate 100 may be from about 0.12 mm to about 0.4 mm. In more detail, the thickness of the supporting plate 100 may be from about 0.125 mm to about 0.3 mm.

The supporting plate 100 may have appropriate elasticity when having the material and thickness described above. Particularly, the supporting plate 100 may have elasticity at a level of being appropriately bent by a finger of a user and the like. The supporting plate 100 may have elasticity to allow pressure received from the finger and the like to be applied to the overall wiping layer 400.

Particularly, when the thickness of the supporting plate 100 is too small, the supporting plate 100 may be crumpled by a force of the finger of the user. On the contrary, when the thickness of the supporting plate 100 is too great, the supporting plate 100 may not be bent well by the force of the finger, thereby reducing cleaning efficiency.

The supporting plate 100 may have a shape which longitudinally elongates. In more detail, a longitudinal length of the supporting plate 100 is greater than a latitudinal width of the supporting plate 100. In more detail, the supporting plate 100 may have a rectangular shape in a top view.

The longitudinal length may be from about 75 mm to about 100 mm. In more detail, the longitudinal length may be from about 80 mm to about 95 mm. In more detail, the longitudinal length may be from about 85 mm to about 90 mm. Also, the latitudinal width may be from about 50 mm to about 65 mm. In more detail, the latitudinal width may be from about 55 mm to about 60 mm.

Also, the supporting plate 100 may include a rounded part. In more detail, in a top view, corners of the supporting plate 100 may be rounded. A curvature radius of the rounded part may be from about 1 mm to about 10 mm. In more detail, the curvature radius of the rounded part may be from about 2 mm to about 6 mm. Here, when the curvature radius is too small, an outer surface of a display panel or case of the mobile device may be scratched while cleaning. Also, when the curvature radius is too great, it is difficult to clean a corner of a screen of the mobile device using the wiping layer 400 at an edge part.

Since the corner of the supporting plate 100 is rounded, the cleaning apparatus for mobile device according to the present embodiment may prevent the display panel and case of the mobile device from being scratched. In result, since the cleaning apparatus for the mobile device may prevent the occurrence of scratches, it is easy to clean using the wiping layer 400 at the edge part. Accordingly, the cleaning apparatus for the mobile device may clean the corner of the screen of the mobile device using the edge part.

The supporting plate 100 and the wiping layer 400 may have substantially same plane shape. That is, sides of the supporting plate 100 and sides of the wiping layer 400 may be disposed at the same plane. In other words, an outside of the supporting plate 100 may be substantially identical to an outside of the wiping layer 400.

Accordingly, the cleaning apparatus for the mobile device may be easily gripped by a hand of the user with improved portability. That is, since the cleaning apparatus for the mobile device has a similar size to a business card or credit card, improved portability may be provided. Also, the cleaning apparatus for the mobile device may have an appropriate planar area for wiping the screen of the mobile device.

Also, since having the material, thickness, length, and width as described above, the supporting plate 100 may have appropriate elasticity for wiping the screen of the mobile device. That is, when the supporting plate 100 has the size as described above, is a plastic film, and has the thickness as described above, elasticity for easily wiping the mobile device using the force of the finger of the user may be provided.

The first adhesive film 200 is disposed below the supporting plate 100. The first adhesive film 200 is adhered or joined to a bottom surface of the supporting plate 100. In more detail, the first adhesive film 200 is adhered or joined to the entire bottom surface of the supporting plate 100.

The first adhesive film 200 may be a heat sealing film adhered through heat. The first adhesive film 200 may include a heat sealing resin. The heat sealing resin may be thermoplastic resin. In more detail, the first adhesive film 200 may be generally formed of thermoplastic resin.

The heat sealing resin may have a much lower melting point than that of the supporting plate 100. In more detail, the melting point of the heat sealing resin may be lower by from about 5° C. to about 100° C. than the melting point of the supporting plate 100. In more detail, the melting point of the heat sealing resin may be from about 50° C. to about 150° C. In more detail, the melting point of the heat sealing resin may be from about 60° C. to about 130° C. In more detail, the melting point of the heat sealing resin may be from about 70° C. to about 120° C. In more detail, the melting point of the heat sealing resin may be from about 80° C. to about 110° C.

The first adhesive film 200 may include a polypropylene resin, a polyamide resin, a polyurethane resin, an ethylene vinyl acetate resin, a polyester resin, and a mixed resin thereof. In more detail, the first adhesive film 200 may include a low density polyethylene (LDPE) resin or a linear low density polyethylene (LLDPE) resin.

A thickness T2 of the first adhesive film 200 may be from about 0.01 mm to about 0.1 mm. In more detail, the thickness T2 of the first adhesive film 200 may be from about 0.01 mm to about 0.08 mm. In more detail, the thickness T2 of the first adhesive film 200 may be from about 0.04 mm to about 0.06 mm.

The second adhesive film 300 is disposed below the first adhesive film 200. In more detail, the second adhesive film 300 is adhered or joined to a bottom surface of the first adhesive film 200. In more detail, the second adhesive film 300 is adhered or joined to a part of the bottom surface of the first adhesive film 200.

The second adhesive film 300 may be a heat sealing film adhered through heat. The second adhesive film 300 may include a heat sealing resin. The heat sealing resin may be a thermoplastic resin. In more detail, the second adhesive film 300 may be generally formed of the thermoplastic resin. The second adhesive film 300 may be formed of the same resin as that of the first adhesive film 200 or may be formed of a different resin.

The heat sealing resin may have a much lower melting point than that of the supporting plate 100. In more detail, the melting point of the heat sealing resin may be lower by from about 5° C. to about 100° C. than the melting point of the supporting plate 100. In more detail, the melting point of the heat sealing resin may be from about 50° C. to about 150° C. In more detail, the melting point of the heat sealing resin may be from about 60° C. to about 130° C. In more detail, the melting point of the heat sealing resin may be from about 70° C. to about 120° C. In more detail, the melting point of the heat sealing resin may be from about 80° C. to about 110° C.

The second adhesive film 300 may include a polypropylene resin, a polyamide resin, a polyurethane resin, an ethylene vinyl acetate resin, a polyester resin, and a mixed resin thereof. In more detail, the second adhesive film 300 may include an LDPE resin or an LLDPE resin.

A thickness T3 of the second adhesive film 300 may be from about 0.01 mm to about 0.1 mm. In more detail, the thickness T3 of the second adhesive film 300 may be from about 0.01 mm to about 0.08 mm. In more detail, the thickness T3 of the second adhesive film 300 may be from about 0.04 mm to about 0.06 mm.

The first adhesive film 200 and the second adhesive film 300 have relatively very smaller thicknesses than the supporting plate 100. For example, the thicknesses T2 and T3 of the first adhesive film 200 and the second adhesive film 300 may be from about 1/10 to about 1/3 of the thickness T1 of the supporting plate 100. Accordingly, the supporting plate 100 has higher flexural elasticity than the first adhesive film 200 and the second adhesive film 300, and the first adhesive film 200 and the second adhesive film 300 are supported by the supporting plate 100.

The wiping layer 400 is disposed below the second adhesive film 300. In more detail, the wiping layer 400 is cohered with a bottom of the second adhesive film 300. In more detail, the wiping layer 400 is cohered with the entire bottom surface of the second adhesive film 300. In more detail, the wiping layer 400 is adhered to the second adhesive film 300 through heat and pressure.

The wiping layer 400 may include fiber. In more detail, the wiping layer 400 may include microfiber. In more detail, the wiping layer 400 may include microfiber of 0.5 denier or less. In more detail, the wiping layer 400 may include microfiber fabric. In more detail, the wiping layer 400 may be formed of microfiber fabric.

The wiping layer 400 may include fabric. In more detail, the wiping layer 400 may include fabric formed of microfiber. That is, the fabric of the wiping layer 400 may wipe foreign substances which contaminate the screen of the mobile device well and may minimize the occurrence of scratches on the screen. In more detail, the wiping layer 400 may include a fabric layer. In more detail, the wiping layer 400 may be generally formed of fabric.

A thickness of the wiping layer 400 may be from about 0.1 mm to about 1 mm. In more detail, the thickness of the wiping layer 400 may be from about 0.5 mm to about 0.7 mm. When the thickness of the wiping layer 400 is too small, the cleaning apparatus for the mobile device cannot efficiently clean the screen of the mobile device. Also, when the thickness of the wiping layer 400 is too small, the supporting plate 100 may scratch the screen of the mobile device. Also, when the thickness of the wiping layer 400 is too great, the wiping layer 400 may be detached from the supporting plate 100.

The cleaning apparatus for the mobile device according to the present embodiment may further include one or more barrier layers.

The bather layer may be disposed between the wiping layer 400 and the second adhesive film 300. Here, an additional adhesive layer may intervene between the barrier layer and the wiping layer 400. The barrier layer may intervene between the first adhesive film 200 and the supporting plate 100. The supporting plate 100 may be coated with the bather layer. The bather layer may be formed in any position to improve sealing performance of a cleaning solution accommodating.

Accordingly, the bather layer may improve sealing performance of the cleaning solution. For example, the barrier layer may prevent a part of the cleaning solution from penetrating the second adhesive film 300 and evaporating outward. Also, the barrier layer may prevent the cleaning solution from penetrating the first adhesive film 200 and the supporting plate 100 and evaporating outward.

The barrier layer may have higher barrier properties than the supporting plate 100, the first adhesive film 200, and the second adhesive film 300. For example, the bather layer may include a metal such as aluminum, an inorganic material such as a silicon oxide, or a polymer with high density. That is, the barrier layer may be a metal layer, an inorganic layer, or a high-density polymer layer.

The first adhesive film 200 and the second adhesive film 300 are joined to each other. In more detail, the first adhesive film 200 and the second adhesive film 300 are partially joined to each other. That is, joint areas JA1, JA2, JA3, JA4, JA5, JA6, and JA7 are formed in areas at which the first adhesive film 200 and the second adhesive film 300 are joined to each other.

In more detail, as shown in FIGS. 3 to 7, the cleaning apparatus for the mobile device according to the present embodiment includes the joint areas JA1, JA2, JA3, JA4, JA5, JA6, and JA7. The joint areas JA1, JA2, JA3, JA4, JA5, JA6, and JA7 are areas at which the first adhesive film 200 and the second adhesive film 300 meet and join each other.

The joint areas JA1, JA2, JA3, JA4, JA5, JA6, and JA7 are areas at which the first adhesive film 200 and the second adhesive film 300 are strongly joined or adhered to each other. Accordingly, at the joint areas JA1, JA2, JA3, JA4, JA5, JA6, and JA7, the first adhesive film 200 and the second adhesive film 300 are not detached from each other. In more detail, when the user uses the cleaning apparatus for the mobile device, at the joint areas JA1, JA2, JA3, JA4, JA5, JA6, and JA7, the first adhesive film 200 and the second adhesive film 300 are strongly joined or adhered to each other and are not spaced apart from each other. That is, the joint areas JA1, JA2, JA3, JA4, JA5, JA6, and JA7 are areas at which the first adhesive film 200 and the second adhesive film 300 are not detached from each other by pressure from the finger of the user.

The second adhesive film 300 is indirectly joined or adhered to the supporting plate 100 through the first adhesive film 200. That is, the second adhesive film 300 is joined or adhered to the first adhesive film 200, and the first adhesive film 200 is adhered to the entire bottom surface of the supporting plate 100.

The cleaning solution is contained below the supporting plate 100 and above the second adhesive film 300. In more detail, the cleaning solution is contained between the first adhesive film 200 and the second adhesive film 300. In more detail, a cleaning solution accommodating portion 500 is formed in an area between the first adhesive film 200 and the second adhesive film 300 and in an area in which the joint areas JA1, JA2, JA3, JA4, JA5, JA6, and JA7 are not formed.

The first adhesive film 200 and the second adhesive film 300 are sealing layers to seal the cleaning solution therebetween. That is, the first adhesive film 200 and the second adhesive film 300 may function as the sealing layers to prevent the cleaning solution from leaking outward.

As shown in FIG. 8, the first adhesive film 200 may be omitted. That is, the second adhesive film 300 may be directly joined to the supporting plate 100. In this case, the supporting plate 100 may function as a sealing layer for accommodating the cleaning solution while supporting the second adhesive film 300 and the wiping layer 400. That is, the supporting plate 100 may be a sealing layer which is opposite to the second adhesive film 300 and contains the cleaning solution.

The second adhesive film 300 includes a through hole 310. The through hole 310 is an ejection hole for ejecting the cleaning solution in the cleaning solution accommodating portion 500 to the wiping layer 400. The through hole 310 may be formed except an area in which the cleaning solution accommodating portion 500 is formed. That is, the through hole 310 may be formed in an area spaced from the cleaning solution accommodating portion 500 at a certain interval.

The through hole 310 penetrates the second adhesive film 300. The through hole 310 may have a circular shape or a shape which extends in one direction in a top view. Here, a diameter or width of the through hole 310 may be from about 0.001 mm to about 2 mm. In more detail, the diameter or width of the through hole 310 may be from about 0.001 mm to about 0.1 mm. In more detail, the diameter or width of the through hole 310 may be from about 0.005 mm to about 0.05 mm.

Also, the an additional through hole may be formed in the wiping layer 400. The additional through hole may be formed corresponding to the through hole 310 of the second adhesive film 300. Accordingly, through the through hole 310 and the additional through hole, the cleaning solution may be easily ejected to a bottom surface of the wiping layer 400. Particularly, when a viscosity of the cleaning solution is high, the cleaning solution may easily be ejected through the additional through hole by small pressure.

The joint areas JA1, JA2, JA3, JA4, JA5, JA6, and JA7 include a first joint area JA1, a second joint area JA2, a third joint area JA3, a fourth joint area JA4, a fifth joint area JA5, a sixth joint area JA6, and a seventh joint area JA7.

The first joint area JA1 extends along the periphery of the cleaning solution accommodating portion 500 in a top view. In more detail, the first joint area JA1 nearly surrounds the periphery of the cleaning solution accommodating portion 500.

The second joint area JA2 extends from the first joint area JA1. In more detail, the second joint area JA2 extends from the first joint area JA1 toward the through hole 310. The second joint area JA2 may extend from one end of the first joint area JA1.

The third joint area JA3 extends from the first joint area JA1. In more detail, the third joint area JA3 extends from the first joint area JA1 toward the through hole 310. The third joint area JA3 may extend from the other end of the first joint area JA1.

The second joint area JA2 and the third joint area JA3 are spaced apart from each other. The second joint area JA2 and the third joint area JA3 may extend in parallel. An area between the second joint area JA2 and the third joint area JA3 is defined as an ejection pressure applying portion 510. The ejection pressure applying portion 510 is formed between the second joint area JA2 and the third joint area JA3 and between the first adhesive film 200 and the second adhesive film 300.

The ejection pressure applying portion 510 extends from the cleaning solution accommodating portion 500. The ejection pressure applying portion 510 extends from the cleaning solution accommodating portion 500 toward the through hole 310. The ejection pressure applying portion 510 is a guide portion which guides the cleaning solution in the cleaning solution accommodating portion 500 to the through hole 310. Also, the ejection pressure applying portion 510 is a device for applying pressure from the finger of the user to eject the cleaning solution through the through hole 310.

Also, the ejection pressure applying portion 510 is an outlet through which the cleaning solution in the cleaning solution accommodating portion 500 is discharged. Also, the ejection pressure applying portion 510 is a device for applying pressure using the finger of the user to eject the cleaning solution through the through hole 310. That is, the user pushes the cleaning solution in the ejection pressure applying portion 510 and slowly applies pressure toward the through hole 310, thereby allowing the cleaning solution in the ejection pressure applying portion 510 to be ejected to the wiping layer 400.

In more detail, the user pushes the cleaning solution in the cleaning solution accommodating portion 500 into the ejection pressure applying portion 510. After that, the user may block a space between the cleaning solution accommodating portion 500 and the ejection pressure applying portion 510 using one part of a thumb and may push and apply pressure to the ejection pressure applying portion 510 using the other part of the thumb. Accordingly, the cleaning solution in the ejection pressure applying portion 510 is ejected to the wiping layer 400 through the through hole 310. After that, the user may clean the mobile device using the ejected cleaning solution and the wiping layer 400.

Here, the ejection pressure applying portion 510 may extend from the cleaning solution accommodating portion 500 toward the through hole 310. Also, a width W1 of the ejection pressure applying portion 510 may be from about 0.5 cm to about 3 cm and a length of the ejection pressure applying portion 510 may be from about 0.5 cm to about 5 cm. In more detail, the width W1 of the ejection pressure applying portion 510 may be from about 0.7 cm to about 2 cm and the length of the ejection pressure applying portion 510 may be from about 0.7 cm to about 5 cm. In more detail, the width W1 of the ejection pressure applying portion 510 may be from about 0.8 cm to about 1.5 cm and the length of the ejection pressure applying portion 510 may be from about 0.8 cm to about 5 cm.

Since the ejection pressure applying portion 510 has an appropriate width, it is easy to eject the cleaning solution in the cleaning solution accommodating portion 500. Particularly, when the width W1 of the ejection pressure applying portion 510 is very small and less than about 0.5 cm, it is not easy for the user to push the cleaning solution in the cleaning solution accommodating portion 500 into the ejection pressure applying portion 510. Also, when the width W1 of the ejection pressure applying portion 510 is very great and more than 1.5 cm, it is impossible for the user to easily apply ejection pressure to the through hole 310 using the finger. Also, when the width W1 and the length of the ejection pressure applying portion 510 are appropriate, the user may properly eject the cleaning solution once through the ejection pressure applying portion 510.

That is, when the width W1 of the ejection pressure applying portion 510 is greater than a general width of a finger of a human, it is difficult for the user to block the space between the ejection pressure applying portion 510 and the cleaning solution accommodating portion 500. Accordingly, when the width W1 of the ejection pressure applying portion 510 is too great, it is impossible to apply pressure to the ejection pressure applying portion 510 using the finger and the cleaning solution is not easily ejected.

Accordingly, when the width W1 and the length of the ejection pressure applying portion 510 are the same as described above, the user may eject an appropriate amount of the cleaning solution to clean the mobile device through one time ejection.

The fourth joint area JA4 extends from the second joint area JA2. In more detail, the fourth joint area JA4 may extend from one end of the second joint area JA2. In more detail, the fourth joint area JA4 may extend from the second joint area JA2 toward the through hole 310.

The fifth joint area JA5 extends from the third joint area JA3. In more detail, the fifth joint area JA5 may extend from one end of the third joint area JA3. In more detail, the fifth joint area JA5 may extend from the third joint area JA3 toward the through hole 310.

The fourth joint area JA4 and the fifth joint area JA5 are spaced apart from each other. A flow control line 520 may be defined between the fourth joint area JA4 and the fifth joint area JA5. The flow control line 520 is formed between the fourth joint area JA4 and the fifth joint area JA5 and between the first adhesive film 200 and the second adhesive film 300.

The flow control line 520 is a flow channel to allow the cleaning solution to appropriately move from the ejection pressure applying portion 510 to the through hole 310. Also, the flow control line 520 prevents the cleaning solution in the cleaning solution accommodating portion 500 from being unintentionally moved to the through hole 310.

A width W2 of the flow control line 520 is smaller than the width W1 of the ejection pressure applying portion 510. In more detail, the width W2 of the flow control line 520 may be from about 1/10 to 1/2 of the width W1 of the ejection pressure applying portion 510.

The sixth joint area JA6 extends from the fourth joint area JA4. Also, the sixth joint area JA6 extends from the fifth joint area JA5. That is, one end of the sixth joint area JA6 is connected to the fourth joint area JA4 and the other end is connected to the fifth joint area JA5. The sixth joint area JA6 may extend along a circumference of the through hole 310.

A temporary storage portion 530 is defined in the sixth joint area JA6. The temporary storage portion 530 is surrounded by the sixth joint area JA6. The temporary storage portion 530 is formed in an area surrounded by the sixth joint area JA6 between the first adhesive film 200 and the second adhesive film 300. Also, the through hole 310 is formed in the temporary storage portion 530.

The temporary storage portion 530 is connected to the flow control line 520. The temporary storage portion 530 temporarily stores the cleaning solution which flows through the flow control line 520 and then ejects the cleaning solution to the through hole 310 due to pressure from the ejection pressure applying portion 510.

The cleaning solution accommodating portion 500 may generally have a flat shape.

Here, an average height H of the cleaning solution accommodating portion 500 may be from about 0.05 mm to 2 mm Here, a maximum height of the cleaning solution accommodating portion 500 may be about 3 mm or less. In more detail, the average height H of the cleaning solution accommodating portion 500 may be from about 0.05 mm to 1.5 mm Here, the maximum height of the cleaning solution accommodating portion 500 may be about 2.5 mm or less. In more detail, the average height H of the cleaning solution accommodating portion 500 may be from about 0.05 mm to 1 mm Here, the maximum height of the cleaning solution accommodating portion 500 may be about 1.5 mm or less. The average height H of the cleaning solution accommodating portion 500 may be from about 0.05 mm to 0.8 mm Here, the maximum height of the cleaning solution accommodating portion 500 may be about 1 mm or less.

Here, the height of the cleaning solution accommodating portion 500 means a vertical distance between a top surface and a bottom surface of the cleaning solution accommodating portion 500. That is, the height of the cleaning solution accommodating portion 500 means a distance between a bottom surface of the first adhesive film 200 and a top surface of the second adhesive film 300.

Here, the average height H is an average of heights in respective plane positions. The plane positions from about 50 to about 1000 of the cleaning solution accommodating portion 500 may be determined to be spaced at equivalent intervals. After that, heights may be measured at respective positions and the average of the respective heights may be obtained.

A planar area of the cleaning solution accommodating portion 500 may be from about 10 cm² to about 50 cm². The planar area of the cleaning solution accommodating portion 500 may be from about 15 cm² to about 45 cm². In more detail, the planar area of the cleaning solution accommodating portion 500 may be from about 20 cm² to about 40 cm². In more detail, the planar area of the cleaning solution accommodating portion 500 may be from about 25 cm² to about 35 cm².

The cleaning solution accommodating portion 500 may have a flat shape not to allow a difference between a longitudinal length and a latitudinal width to be great. For example, a ratio of the longitudinal length to the latitudinal width may be from about 1:1 to about 5:1. In more detail, the ratio of the longitudinal length to the latitudinal width may be from about 1:1 to about 3:1.

The width W2 of the flow control line 520 may be from about 0.5 mm to about 3 mm. In more detail, the width W2 of the flow control line 520 may be from about 0.8 mm to about 1.8 mm.

The seventh joint area JA7 is formed in an area except areas in which the cleaning solution accommodating portion 500, the ejection pressure applying portion 510, the flow control line 520, and the temporary storage portion 530 are formed. The seventh joint area JA7 is formed corresponding to an area in which a groove pattern is formed in the wiping layer 400. That is, the first adhesive film 200 and the second adhesive film 300 are mutually joined or adhered, thereby forming the seventh joint area JA7 and simultaneously forming the groove pattern in the wiping layer 400. Also, a protrusion pattern 410 is formed in the wiping layer 400 beside the groove pattern. That is, an area of the wiping layer 400 in which the seventh joint area JA7 is formed may be a pattern area. The pattern area may be formed beside the cleaning solution accommodating portion 500.

Here, the pattern area of the wiping layer 400 includes the groove pattern and the protrusion pattern 410. In more detail, the groove pattern and the protrusion pattern 410 may be formed on a bottom surface of the wiping layer 400. That is, the wiping layer 400 may have an uneven structure on the bottom surface. A groove of the groove pattern is formed between protrusions of the protrusion pattern 410, and the protrusion is formed between the grooves.

The groove pattern may include a first groove pattern and a second groove pattern. The first groove pattern may extend in a first direction, and the second groove pattern may extend in a second direction. The first direction and the second direction may be intersected with each other.

A depth of the groove pattern may be from about 0.1 mm to about 0.5 mm. A width of an entrance of the groove pattern may be from about 0.5 mm to about 1 mm. A cross-sectional shape of the groove pattern may be a trapezoidal shape or a ⊏ shape. Unlike this, the cross-sectional shape of the groove pattern may be a V shape or an U shape.

The cleaning apparatus according to the present embodiment includes the groove pattern and the protrusion pattern 410, thereby effectively removing foreign substances on the screen of the mobile device. Particularly, since the foreign substances are accumulated in the groove pattern, the foreign substances are detached from the screen of the mobile device, thereby preventing the screen from being contaminated again.

Particularly, micro foreign substances may be collected at the fabric and large foreign substances may be collected in the groove pattern or between the protrusion patterns 410. That is, the wiping layer 400 is a fabric layer formed with patterns, thereby effectively removing large foreign substances and micro foreign substances.

Also, areas other than the protrusion pattern 410 or the groove pattern may intensively receive pressure from the supporting plate 100. Accordingly, the wiping layer 400 may effectively apply pressure to the screen of the mobile device.

Also, an edge of the protrusion pattern 410 may maximize a frictional force with the screen and an outer surface of the mobile device. Accordingly, the cleaning apparatus according to the embodiment may effectively clean the mobile device.

As described above, the groove pattern and the protrusion pattern 410 are formed through a lamination process described above. Accordingly, the cleaning apparatus according to the present embodiment may be easily manufactured through a simple process.

As shown in FIG. 9, the groove pattern may have a honeycomb structure and the protrusion pattern 410 may have a polygonal shape. In more detail, the protrusion pattern 410 may have a regular polygonal shape. In more detail, the protrusion pattern 410 may have a regular hexagonal shape. As described above, when the protrusion pattern 410 has the polygonal shape, the frictional force at the edge may increase and the cleaning apparatus according to the embodiment may have improved cleaning performance.

As shown in FIG. 10, the protrusion pattern 410 may have a diamond shape. Here, one of internal angles of the diamond may be from about 20° to about 80°. Accordingly, the protrusion pattern 410 may have a bidirectionally-pointed shape. Also, the frictional force at the edge may increase and the cleaning apparatus according to the embodiment may have improved cleaning performance.

As shown in FIG. 11, the protrusion pattern may include a rectangular protrusion pattern 411 and a foursquare protrusion pattern 412. The rectangular protrusion pattern 411 and the foursquare protrusion pattern 412 may be arranged in a mosaic shape.

As shown in FIG. 12, the protrusion pattern 410 may have an island shape or a dot shape. The protrusion pattern may have a circular shape or an oval shape.

Accordingly, the cleaning apparatus according to the embodiment may effectively clean the mobile device.

A temporary shutoff area WA is formed at the ejection pressure applying portion 510, the flow control line 520, and the temporary storage portion 530. The temporary shutoff area WA is an area in which the first adhesive film 200 and the second adhesive film 300 are adhered to or in contact with each other. In more detail, the temporary shutoff area WA is an area in which the first adhesive film 200 and the second adhesive film 300 are adhered to or in contact with each other when external pressure is not applied. Also, the temporary shutoff area WA is an area in which the first adhesive film 200 and the second adhesive film 300 are spaced from each other by pressure from the finger of the user. Also, the temporary shutoff area WA is an area in which the first adhesive film 200 and the second adhesive film 300 are adhered to or in contact with each other when external pressure is removed. Also, the temporary shutoff area WA is an area in which the bottom surface of the first adhesive film 200 and the top surface of the second adhesive film 300 are attached to each other and then spaced from each other while maintaining interfaces in contact. That is, at the temporary shutoff area WA, the first adhesive film 200 and the second adhesive film 300 are not torn by the pressure from the finger and are spaced from each other.

Referring to FIG. 8, the cleaning apparatus for the mobile device may omit the first adhesive film. Accordingly, the second adhesive film 300 may be directly joined to the supporting plate 100.

Accordingly, the second adhesive film 300 may be directly joined to the supporting plate 100 and the joint areas JA1, JA2, JA3, JA4, JA5, JA6, and JA7 may be formed. Also, between the supporting plate 100 and the second adhesive film 300, the cleaning solution accommodating portion 500, the ejection pressure applying portion 510, the flow control line 520, and the temporary storage portion 530 are formed. Here, the supporting plate 100 may perform a function of a sealing layer. Also, the second adhesive film 300 may perform the function of the sealing layer.

That is, the top surface of the cleaning solution accommodating portion 500 is the bottom surface of the supporting plate 100 and the height of the cleaning solution accommodating portion 500 is a distance between the bottom surface of the supporting plate 100 and the top surface of the second adhesive film 300.

Also, the temporary shutoff area WA is formed at the ejection pressure applying portion 510, the flow control line 520, and the temporary storage portion 530. The temporary shutoff area WA may be formed by mutual contact or adhesion between the supporting plate 100 and the second adhesive film 300.

As described above, compared with the planar area of the cleaning solution accommodating portion 500, the height of the cleaning solution accommodating portion 500 is very small. Accordingly, the cleaning apparatus for the mobile device generally has a plate shape. Accordingly, even when an undesirable pressure is applied, the cleaning solution in the cleaning solution accommodating portion 500 is not ejected through the through hole 310.

As shown in FIGS. 13 and 14, when pressure is cylindrically applied to the cleaning solution accommodating portion 500, before the cleaning solution is ejected, the first adhesive film 200 and the second adhesive film 300 are in contact with each other.

In more detail, through the wiping layer 400, using one end of a cylinder having a diameter about 2 cm, in a vertical direction toward the supporting plate 100, pressure may be applied to allow the top surface and bottom surface of the cleaning solution accommodating portion 500 to be in contact with each other. In more detail, through the wiping layer 400, using one end of a cylinder having a diameter about 3 cm, in a vertical direction toward the supporting plate 100, pressure may be applied to allow the top surface and bottom surface of the cleaning solution accommodating portion 500 to be in contact with each other. Here, pressure inside the cleaning solution accommodating portion 500 is dispersed and the cleaning solution is not ejected through the through hole 310.

Referring to FIGS. 15 and 16, the cleaning apparatus for the mobile device may eject the cleaning solution using a following method.

First, the user pushes the cleaning solution in the cleaning solution accommodating portion 500 into the ejection pressure applying portion 510 using the finger, and particularly, the thumb. Here, since the width W1 of the ejection pressure applying portion 510 is appropriate as described above, the cleaning solution may easily flow therein. After that, the cleaning solution flows into the ejection pressure applying portion 510 and the first adhesive film 200 and the second adhesive film 300 are spaced from each other at the temporary shutoff area WA.

That is, since the first adhesive film 200 and the second adhesive film 300 are weakly adhered to or in weak contact with each other at the temporary shutoff area WA, the temporary shutoff area WA may be easily opened from a sealed state by the pressure of the finger of the user.

After that, the user pushes and blocks the space between the ejection pressure applying portion 510 and the cleaning solution accommodating portion 500 using one part of the thumb. After that, the user pushes the ejection pressure applying portion 510 using the other part of the thumb and allows the cleaning solution which flows into the ejection pressure applying portion 510 to be ejected to the through hole 310 through the flow control line 520. That is, the temporary shutoff area WA in the flow control line 520 is open, thereby ejecting the cleaning solution.

Here, the supporting plate 100 supports the ejection pressure applying portion 510 while being in contact with a palm or other fingers. Accordingly, the thumb and the like is in direct contact with the wiping layer 400 and then pressure is applied to the cleaning solution accommodating portion 500 and the ejection pressure applying portion 510, thereby easily ejecting the cleaning solution.

After the cleaning solution is ejected, the user may apply pressure to the ejection pressure applying portion 510 to discharge again the cleaning solution which remains in the ejection pressure applying portion 510 into the cleaning solution accommodating portion 500.

Accordingly, the cleaning solution almost escapes from the ejection pressure applying portion 510 and then the temporary shutoff area WA may be formed again at the ejection pressure applying portion 510. That is, in the ejection pressure applying portion 510, the first adhesive film 200 and the second adhesive film 300 may maintain a mutual contact state. That is, since the supporting plate 100 strains the first adhesive film 200 and the second adhesive film 300, the first adhesive film 200 and the second adhesive film 300 may maintain the mutual contact state at the temporary shutoff area WA formed again.

Accordingly, the cleaning solution accommodating portion 500 may be sealed again by the temporary shutoff area WA.

Referring to FIGS. 17 to 20, the cleaning apparatus for the mobile device according to the present embodiment may be manufactured through a following process.

First, a base film 101 and the first adhesive film 200 are mutually laminated, thereby manufacturing an adhesive base film 103.

The base film 101 includes a plastic film. The base film 101 may be formed of a material substantially identical to that of the supporting plate 100 described above.

Unlike this, paper may be used instead of the base film 101. One side of the paper may be coated to be waterproof. A printing layer which displays information may be formed on the other side of the paper.

Also, the base film 101 and the paper may be used together. That is, the paper may be cohered on the base film 101. Accordingly, not only waterproof performance may be provided but also a printing layer may be easily formed on the paper. That is, the printing layer may be easily formed through a simple process such as an inkjet printing process at low costs.

The base film 101 may be supplied as a roll shape. The first adhesive film 200 may include a thermoplastic resin. The first adhesive film 200 may include a material substantially identical to that of the first adhesive film 200. The first adhesive film 200 may be supplied as a roll shape.

As shown in FIG. 17, the adhesive base film 103 is supplied to a first unwinding roll 12 as a roll shape. The adhesive base film 103 is unwound from the first unwinding roll 12 and supplied to a space between a first laminating portion 42 and a second laminating portion 44 by a first guide roll 13.

Also, a microfiber fabric sheet 401 and the second adhesive film 300 are mutually laminated, thereby manufacturing a wiping sheet 302.

The microfiber fabric sheet 401 includes microfiber fabric. The microfiber fabric sheet 401 may be formed of a material substantially identical to that of the wiping layer 400 described above. The microfiber fabric sheet 401 may be supplied as a roll shape.

The second adhesive film 300 may include a thermoplastic resin. The second adhesive film 300 may include a material substantially identical to that of the second adhesive film 300. The second adhesive film 300 may be supplied as a roll shape.

The wiping sheet 302 is supplied to a second unwinding roll 32 as a roll shape. The wiping sheet 302 is unwound from the second unwinding roll 32 and supplied to a space between the first laminating portion 42 and the second laminating portion 44 by a second guide roll 33.

The wiping sheet 302 and the adhesive base film 103 are arranged to allow the first adhesive film 200 and the second adhesive film 300 to face each other.

After that, as shown in FIGS. 18 and 19, the wiping sheet 302 and the adhesive base film 103 may be preliminary partially joined to each other by the first laminating portion 42 and the second laminating portion 44.

The first laminating portion 42 is disposed below the microfiber fabric sheet 401. The first laminating portion 42 is a mold including a first protrusion pattern 46 formed thereon. The first laminating portion 42 applies heat and pressure to the wiping sheet 302. That is, the first protrusion pattern 46 is in direct contact with the microfiber fabric sheet 401 and applies heat and pressure to the microfiber fabric sheet 401 and the second adhesive film 300.

The second laminating portion 44 is disposed above the base film 101. The second laminating portion 44 may be in direct contact with the base film 101. A bottom surface of the second laminating portion 44 may be generally flat.

The wiping sheet 302 and the adhesive base film 103 are arranged between the first laminating portion 42 and the second laminating portion 44. Also, a cleaning solution injection portion 23 is disposed between the wiping sheet 302 and the adhesive base film 103.

After that, the first laminating portion 42 and the second laminating portion 44 mutually compress the wiping sheet 302 and the adhesive base film 103. Accordingly, the first adhesive film 200 and the second adhesive film 300 are partially joined to each other. Accordingly, a part of the first joint area JA1, the second joint area JA2, the third joint area JA3, the fourth joint area JA4, the fifth joint area JA5, the sixth joint area JA6, and the seventh joint area JA7 are formed.

Accordingly, the first joint area JA1, the second joint area JA2, the third joint area JA3, the fourth joint area JA4, the fifth joint area JA5, the sixth joint area JA6, and the seventh joint area JA7 are formed by heat and pressure directly applied by the first protrusion pattern 46.

Also, the ejection pressure applying portion 510, the flow control line 520, and the temporary storage portion 530 are formed.

Here, the temporary barrier area WA is formed at the ejection pressure applying portion 510, the flow control line 520, and the temporary storage portion 530. The temporary storage portion 530 is formed by heat indirectly applied to the first adhesive film 200 from the first laminating portion 42. That is, the first adhesive film 200 and the second adhesive film 300 are weakly stuck or adhered to each other at a lower temperature than a temperature for forming the joint areas JA1, JA2, JA3, JA4, JA5, JA6, and JA7, thereby forming the temporary shutoff area WA. In more detail, the temporary shutoff area WA may be formed at a temperature lower than the temperature for forming the joint areas JA1, JA2, JA3, JA4, JA5, JA6, and JA7 and higher than softening points of the first adhesive film 200 and the second adhesive film 300.

Since the width W1 of the ejection pressure applying portion 510, that is, a distance between the second joint area JA2 and the third joint area JA3 is small, the temporary shutoff area WA may be easily formed by indirect heat.

Likewise, since the width W2 of the flow control line 520 is appropriately small, the temporary shutoff area WA may be easily formed in the flow control line 520.

That is, the temporary shutoff area WA may be formed at a time using indirect heat in a process of forming the joint areas JA1, JA2, JA3, JA4, JA5, JA6, and JA7 without an additional process.

Also, the cleaning solution accommodating portion 500 surrounded by the first joint area JA1 is formed. Here, since the cleaning solution injection portion 23 is inserted in the area in which the cleaning solution accommodating portion 500 is formed and the space between the first adhesive film 200 and the second adhesive film 300, the temporary shutoff area WA is not formed in the cleaning solution accommodating portion 500. That is, the first adhesive film 200 and the second adhesive film 300 are spaced by the cleaning solution injection portion 23 in the area in which the cleaning solution accommodating portion 500 is formed. Accordingly, even when indirect heat is applied, the first adhesive film 200 and the second adhesive film 300 are not weakly stuck or adhered to each other in the area in which the cleaning solution accommodating portion 500 is formed.

Also, when the temporary shutoff area WA is formed at the temperature lower than the softening points of the first adhesive film 200 and the second adhesive film 300, the first adhesive film 200 and the second adhesive film 300 only maintain a mutual contact state at the temporary shutoff area WA.

After that, the cleaning solution is injected into the cleaning solution accommodating portion 500 through the cleaning solution injection portion 23. Here, the cleaning solution is injected only into the cleaning solution accommodating portion 500 and is not injected into the temporary shutoff area WA.

After that, the cleaning solution injection portion 23 is separated from the cleaning solution accommodating portion 500 and the wiping sheet 302 and the adhesive base film 103 are moved between a third laminating portion 43 and a fourth laminating portion 45 while being mutually joined.

After that, as shown in FIG. 20, to seal the cleaning solution in the cleaning solution accommodating portion 500, the first adhesive film 200 and the second adhesive film 300 are mutually joined. Accordingly, another part of the first joint area JA1 is formed. The other part of the first joint area JA1 is formed by heat and pressure from a second protrusion pattern 47 of the third laminating portion 43.

As described above, the first to seventh joint areas JA1, JA2, JA3, JA4, JA5, JA6, and JA7 are formed through two or more joining processes. That is, the first to seventh joint areas JA1, JA2, JA3, JA4, JA5, JA6, and JA7 are formed through a first joining process, a cleaning solution injection process, and a second joining process.

After that, the wiping sheet 302 and the adhesive base film 103 are blanked out at a time by a blanking portion 50 and transferred by a conveyor belt 70. Also, the through hole 310 is formed in the temporary storage portion 530 and the cleaning apparatus for the mobile device is manufactured.

Also, residual parts of the wiping sheet 302 and the adhesive base film 103 may be collected by a collecting roll 60.

As described above, in the cleaning apparatus for the mobile device, a sealing layer is directly or indirectly joined to the bottom of the supporting plate 100 and the cleaning solution accommodating portion 500 is formed between the supporting plate 100 and the sealing layer.

Here, the planar area of the cleaning solution accommodating portion 500 is large and the average height of the cleaning solution accommodating portion 500 is relatively small. Accordingly, the cleaning solution accommodating portion 500, that is, a space for accommodating the cleaning solution generally has a flat shape. Also, the sealing layer and the wiping layer 400 are adhered to the supporting plate 100 and the sealing layer and the wiping layer 400 have small thicknesses and are supported by the supporting plate 100.

Accordingly, the cleaning apparatus for the mobile device according to the present embodiment generally has a plate shape. In more detail, the cleaning apparatus for the mobile device according to the present embodiment generally has a card shape. Particularly, the cleaning apparatus for the mobile device may have a size easily carried and kept, for example, a size similar to a credit card.

Accordingly, since having the plate shape, and more particularly, the card shape, the cleaning apparatus for the mobile device according to the present embodiment may be easily carried in a pocket of a cellular phone case, a wallet, a handbag, or a pocket. While being carried, unintentional pressure may be applied to the cleaning apparatus for the mobile device according to the present embodiment. Here, since a cleaning portion generally has a flat shape, when external pressure is applied, pressure inside the cleaning solution accommodating portion 500 is dispersed. Particularly, when pressure is externally applied, since the top surface and the bottom surface of the cleaning solution accommodating portion 500 are in contact with each other, internal pressure of the cleaning solution accommodating portion 500 does not increase to a degree of ejecting the cleaning solution.

Accordingly, even when an undesirable pressure is applied, the cleaning solution in the cleaning solution accommodating portion 500 is not ejected through the through hole 310.

Also, the cleaning solution has a high viscosity, for example, from about 10 cps to about 1000 cps. Accordingly, the cleaning solution may be prevented from being ejected along a flow channel which extends from the cleaning solution accommodating portion 500 to the through hole 310 due to a capillary phenomenon at nonpressure.

Accordingly, the cleaning apparatus for the mobile device according to the present embodiment may prevent the cleaning solution from being unintentionally ejected.

Also, the cleaning apparatus for the mobile device according to the present embodiment may further include the ejection pressure applying portion 510. The ejection pressure applying portion 510 may be formed between the cleaning solution accommodating portion 500 and the through hole 310 and may eject the cleaning solution contained in the cleaning solution accommodating portion 500 into the through hole 310 through the pressure of the finger of the user.

That is, the user pushes the cleaning solution in the cleaning solution accommodating portion 500 into the ejection pressure applying portion 510. After that, the user may block the space between the cleaning solution accommodating portion 500 and the ejection pressure applying portion 510 using the thumb and the like and may apply pressure to the ejection pressure applying portion 510 using the blocking finger.

Accordingly, the cleaning solution in the ejection pressure applying portion 510 may be ejected into the through hole 310 and then the user may effectively clean the mobile device using the ejected cleaning solution.

As described above, the cleaning apparatus for the mobile device according to the present embodiment may clean the mobile device by ejecting the cleaning solution at any time desired by the user. That is, in the cleaning apparatus according to the present embodiment, the cleaning solution may be not ejected until the user ejects the cleaning solution using the method described above.

The cleaning apparatus for the mobile device according to the present embodiment is an apparatus for cleaning the mobile device such as a mobile phone and the like. That is, the cleaning apparatus is carried in a wallet, a pocket, or a mobile phone case of the user and the user takes out and uses the cleaning apparatus from the wallet, pocket, or case.

Here, since the cleaning apparatus for the mobile device ejects the cleaning solution only when the user wants, it is possible to prevent the wallet or pocket and the like from being contaminated by undesirable ejection of the cleaning solution while storing the cleaning apparatus. That is, the cleaning apparatus for the mobile device may maximize portability necessary for cleaning the mobile device by preventing the ejection of the cleaning solution which may occur while being carried.

Also, the temporary shutoff area WA is formed in the ejection pressure applying portion 510. Accordingly, the temporary shutoff area WA may temporarily shut off the cleaning solution accommodating portion 500 from the through hole 310 and the cleaning solution accommodating portion 500 may be sealed by the temporary shutoff area WA.

In more detail, the first adhesive film 200 and the second adhesive film 300 are mutually stuck, thereby forming the temporary barrier area WA. Accordingly, a phenomenon in which the cleaning solution leaks or evaporates between the first adhesive film 200 and the second adhesive film 300 at the temporary shutoff area WA may be prevented.

Also, the first adhesive film 200 and the second adhesive film 300 are in contact with each other, thereby forming the temporary bather area WA. Here, the supporting plate 100 has high flexural elasticity. Accordingly, the first adhesive film 200 and the second adhesive film 300 are supported by the supporting plate 100 while being joined to the supporting plate 100.

Accordingly, the first adhesive film 200 and the second adhesive film 300 are to be flat due to the supporting plate 100 while being in contact with each other at the temporary shutoff area WA. Accordingly, since the first adhesive film 200 and the second adhesive film 300 are in contact with each other at the temporary shutoff area WA, a flow channel is barely formed therebetween.

Therefore, the supporting plate 100 fixes the first adhesive film 200 and the second adhesive film 300 of the temporary shutoff area WA flat at the second joint area JA2 and the third joint area JA3. That is, due to the supporting plate 100, the first adhesive film 200 and the second adhesive film 300 maintain a mutual contact state at the temporary shutoff area WA.

Likewise, the first adhesive film 200 and the second adhesive film 300 are supported by the supporting plate 100 while being joined to the supporting plate 100. Accordingly, the first adhesive film 200 and the second adhesive film 300 are maintained flat and in contact with the supporting plate 100 at the temporary shutoff area WA. That is, due to the high flexural elasticity, the supporting plate 100 maintains the sealing layer in contact with the supporting plate 100 at the temporary shutoff area WA.

Accordingly, due to the temporary shutoff area WA, the cleaning solution in the cleaning solution accommodating portion 500 may be prevented from being unintentionally ejected to the through hole 310 while being carried.

Also, since the temporary shutoff area WA seals the cleaning solution accommodating portion 500, the cleaning solution in the cleaning solution accommodating portion 500 may be prevented from evaporating. Accordingly, the cleaning apparatus for the mobile device according to the present embodiment may be used for a long time without a reduction of the cleaning solution. The cleaning apparatus for the mobile device may be used while preventing the cleaning solution from evaporating for a term of consuming the cleaning solution in the cleaning solution accommodating portion 500, for example, about one month.

The user moves the cleaning solution in the cleaning solution accommodating portion 500 to the temporary shutoff area WA using the finger and the like. Accordingly, the first adhesive film 200 and the second adhesive film 300 are spaced from each other at the temporary shutoff area WA.

Accordingly, the cleaning solution is ejected to the wiping layer 400 through the guide portion and the through hole 310.

In more detail, the user pushes the cleaning solution in the cleaning solution accommodating portion 500 into the guide portion. After that, the user may block the space between the cleaning solution accommodating portion 500 and the ejection pressure applying portion 510 using the thumb and the like and may apply pressure to the ejection pressure applying portion 510 using the blocking finger. Accordingly, the cleaning solution in the ejection pressure applying portion 510 is ejected to the wiping layer 400 through the through hole 310. After that, the user may clean the mobile device using the ejected cleaning solution and the wiping layer 400.

After that, the cleaning solution in the ejection pressure applying portion 510 may be nearly removed by the user and the first adhesive film 200 and the second adhesive film 300 may be in contact with or stuck to each other again at the temporary shutoff area WA. That is, since the supporting plate 100 has high flexural elasticity, the first adhesive film 200 and the second adhesive film 300 are restored to a flat state after ejection. Accordingly, the temporary shutoff area WA in the ejection pressure applying portion 510 may be restored and the cleaning solution in the cleaning solution accommodating portion 500 may be sealed.

Accordingly, the cleaning apparatus for the mobile device according to the present embodiment may restrain the evaporation of the cleaning solution and may increase a reusable number.

Also, the supporting plate 100 supports the sealing layer and the wiping layer 400. Accordingly, the supporting plate 100 may transfer pressure of a certain part such as the finger to the overall wiping layer 400. That is, since the supporting plate 100 has relatively high flexural elasticity, the pressure is transferred to a part not pushed by the finger in such a way that the cleaning apparatus for the mobile device may wipe the mobile device using generally uniform pressure.

Particularly, the cleaning apparatus according to the embodiment is utilized as shown in FIG. 21, thereby cleaning the mobile device. The cleaning apparatus according to the embodiment may be divided into a push portion P and a grip portion G. The user, as described above, after ejecting the cleaning solution, may push the push portion P using the finger and may grip the grip portion G using the palm and other fingers. Here, the cleaning solution is ejected in response to the push portion P.

Here, since the supporting plate 100 has the material, thickness, and size as described above, the cleaning apparatus according to the embodiment may effectively clean the outer surface of the mobile device.

As described above, since the cleaning solution accommodating portion 500 has an overall flat shape, the wiping layer 400 may be in uniform contact with the mobile device and in contact with a larger surface, thereby maximizing a cleaning effect.

As described above, due to an appropriately portable size for the user, for example, a size identical to a business card or credit card, the cleaning apparatus for the mobile device according to the present embodiment may be carried in a cellular phone protecting case, a business card case, or a wallet. Accordingly, the cleaning apparatus for the mobile device according to the present embodiment may be not exposed outward and less contaminated while being stored. Accordingly, the cleaning apparatus for the mobile device according to the present embodiment may efficiently clean the screen of the mobile device.

Particularly, the user may eject the cleaning solution to the wiping layer 400 by pushing an area in which the ejection pressure applying portion 510 is disposed using the finger. After that, the user may wipe the screen of the mobile device or a monitor by pushing an area in which the wiping layer 400 is disposed using the finger.

Particularly, since the cleaning solution includes a surfactant, the cleaning apparatus for the mobile device may effectively remove oily foreign substances such as oils. Also, the cleaning solution may further include an antimicrobial or a germicide. Accordingly, the cleaning apparatus for the mobile device according to the present embodiment may have an antibacterial or germicidal function.

Also, the cleaning solution may further include an antistatic agent and/or a coating agent. The coating agent may be high molecular weight alcohol such as polyethylene glycol. Accordingly, after an external screen of the mobile device is cleaned by the cleaning solution, a thin coating film may be formed on the external screen of the mobile device. Accordingly, the external screen of the mobile device may be protected by the coating film and prevented from being contaminated by foreign substances such as dust or oil.

FIG. 22 is a top view of a wiping layer of a cleaning apparatus according to another embodiment of the present invention. FIG. 23 is a cross-sectional view of a part taken along line D-D' shown in FIG. 22. In a description for the present embodiment, the embodiments described above will be referred to. That is, the description of the embodiments described above except changed parts may be intrinsically coupled with the description for the present embodiment.

Referring to FIGS. 22 and 23, the wiping layer 400 may further include a segregation portion 430. The segregation portion 430 may surround an area in which the through hole 310 is formed. In more detail, the segregation portion 430 extends along the circumference of the through hole 310. The segregation portion 430 may have a closed loop shape with the area in which the through hole 310 is formed in the center thereof.

The segregation portion 430 may prevent the cleaning solution ejected from the through hole 310 from spilling over outside the segregation portion 430. Accordingly, due to the segregation portion 430, the wiping layer 400 may be divided into a wet region WR and a dry region DR.

The wet region WR is a region inside the segregation portion 430, and the dry region DR is a region outside the segregation portion 430. When the cleaning solution is ejected, the wet region WR may maintain a wet state and the dry region DR may maintain a dry state.

The segregation portion 430 may be a groove pattern. That is, heat and pressure may be applied to a part of the wiping layer 400 and an area of the wiping layer 400, in which the segregation portion 430 is formed, may be compressed. Accordingly, the area of the wiping layer 400, in which the segregation portion 430 is formed, can not absorb the cleaning solution. Accordingly, the cleaning solution in the wet region WR can not spill over into the dry region DR.

As described above, the cleaning apparatus according to the present embodiment may effectively coat the screen of the mobile device with the cleaning solution using the wet region WR. Simultaneously, the cleaning apparatus according to the present embodiment may effectively wipe the cleaning solution on the screen of the mobile device using the dry region DR.

Accordingly, the cleaning apparatus according to the present embodiment may allow an amount of the cleaning solution desired by the user to be used and may allow the cleaning solution to be effectively wiped. Accordingly, the cleaning apparatus according to the present embodiment may have improved cleaning performance.

FIG. 24 is an exploded perspective view of a cleaning apparatus according to still another embodiment of the present invention. FIG. 25 is a cross-sectional view of the cleaning apparatus according to the present embodiment. FIG. 26 is a view of an apparatus for manufacturing the cleaning apparatus of FIGS. 24 and 25. FIGS. 27 to 32 are views illustrating a process of manufacturing the cleaning apparatus according to the present embodiment. In a description for the present embodiment, the embodiments described above will be referred to. That is, the description of the embodiments described above except changed parts may be intrinsically coupled with the description for the present embodiment.

Referring to FIGS. 24 and 25, the cleaning apparatus according to the present embodiment includes the supporting plate 100, the adhesive film 300, and the wiping layer 400.

The adhesive film 300 includes the cleaning solution accommodating portion 500 and the through hole 310. The cleaning solution accommodating portion 500 contains the cleaning solution. In more detail, the cleaning solution is contained between the adhesive film 300 and the supporting plate 100. The cleaning solution accommodating portion 500 may have a groove shape.

That is, the adhesive film 300 and the supporting plate 100 are sealing layers for accommodating the cleaning solution.

Unlike this, an additional sealing layer may be disposed between the adhesive film 300 and the supporting plate 100. The cleaning solution may be contained between the additional sealing layer and the adhesive film 300.

A diameter of the cleaning solution accommodating portion 500 may be from about 1 mm to about 10 mm. An interval of the cleaning solution accommodating portions 500 may be from about 1 mm to about 5 mm. A depth of the cleaning solution accommodating portion 500 may be from about 0.1 mm to about 1 mm. Also, the cleaning solution accommodating portion 500 may have a circular shape in a top view but is not limited thereto.

The cleaning solution accommodating portions 500 may have an island shape in a top view and may be mutually spaced apart. The number of the cleaning solution accommodating portions 500 may be from about 5 to about 1000. In more detail, the number of the cleaning solution accommodating portions 500 may be from about 10 to about 100.

The cleaning solution accommodating portion 500 may independently contain the cleaning solution from one another. That is, the cleaning solution accommodating portions 500 may be spaced and segregated from one another. That is, the cleaning solution accommodating portions 500 may independently work and may independently outpour the cleaning solution from one another.

Accordingly, since the cleaning solution accommodating portions 500 are independently separate from one another, the user of the cleaning apparatus for the mobile device may eject a part of the cleaning solution in the cleaning solution accommodating portion 500. That is, the user may eject a desirable amount of the cleaning solution by applying pressure to a desirable number of the cleaning solution accommodating portions 500. Accordingly, the user may appropriately control the amount of the ejected cleaning solution.

The through hole 310 may be formed corresponding to the cleaning solution accommodating portion 500. Unlike this, the through hole 310 may be randomly formed. The through hole 310 penetrates the heat sealing film 301. In more detail, the through hole 310 may penetrate from the cleaning solution accommodating portion 500 to a bottom surface of the heat sealing film 301.

When the diameter of the through hole 310 is the same as described above, the cleaning solution may be ejected only by appropriate pressure such as the force of the finger of the user. Particularly, when the viscosity of the cleaning solution is 10 cps or more, it is possible to prevent an unintentional outflow caused by a capillary phenomenon, that is, an outflow which occurs even though pressure is not applied.

The through hole 310 is connected to the wiping layer 400 from the cleaning solution accommodating portion 500. That is, the through hole 310 is an ejection hole for allowing the cleaning solution stored in the cleaning solution accommodating portion 500 to be ejected to the wiping layer 400.

The through hole may be omitted. That is, the adhesive film 200(300) may not include the through hole. Here, due to external pressure, a part of the adhesive film 300 may burst and the cleaning solution may be ejected from some cleaning solution accommodating grooves.

Also, the supporting plate 100 may cover the cleaning solution accommodating portion 500. Accordingly, the cleaning solution intervenes between the supporting plate 100 and the adhesive film 200(300). That is, the cleaning solution is stored between the supporting plate 100 and the adhesive film 200(300).

Also, the adhesive film 200(300) include a joint area JA and a non-joint area.

The joint area JA is cohered with the supporting plate 100. In more detail, the joint area JA is cohered with a bottom surface of the supporting plate 100. Also, the joint area JA is cohered with the wiping layer 400. In more detail, the joint area JA is cohered with a top surface of the wiping layer 400.

Also, the non-joint area NJA is an area other than the joint area JA, that is, an area which is not cohered with the supporting plate 100 and the adhesive film 300. The joint area JA may surround the non-joint area NJA. Also, the joint area JA may surround one or more of the cleaning solution accommodating portions 500. That is, the joint area JA may surround an area in which the cleaning solution is contained. That is, the joint area JA may segregate the cleaning solution accommodating portions 500 from one another.

Accordingly, the cleaning solution may be effectively stored between the supporting plate 100 and the adhesive film 300 due to the joint area JA.

The wiping layer 400 is disposed below the adhesive film 300. In more detail, the wiping layer 400 may be cohered with the adhesive film 300. In more detail, the wiping layer 400 may be adhered to the adhesive film 300 due to heat and pressure.

The cleaning apparatus for the mobile device according to the present embodiment stores the independently divided cleaning solution. Accordingly, the cleaning apparatus for the mobile device according to the present embodiment may easily control the amount of the ejected cleaning solution by controlling the number of the cleaning solution accommodating portions from which the cleaning solution is ejected.

Particularly, since the cleaning solution accommodating portions 500 are spaced and separated from one another, the user may independently eject the cleaning solution stored in some of the cleaning solution accommodating portions 500. Accordingly, according to an area of the supporting plate 100 to which pressure is applied, the amount of the ejected cleaning solution may be controlled.

Referring to FIGS. 26 to 32, the cleaning apparatus for the mobile device according to the present embodiment may be manufactured through a following method.

First, as shown in FIG. 26, an apparatus for manufacturing the cleaning apparatus according to the embodiment is provided.

The manufacturing apparatus includes a first unwinding roll 10, a second unwinding roll 20, a third unwinding roll 30, a first guide roll 11, a second guide roll 24, an embossing forming portion 21, a perforating portion 22, the cleaning solution injection portion 23, a laminating portion 40, the blanking portion 50, and a winding roll 60.

The first unwinding roll 10 unwinds the base film 101. That is, the base film 101 is supplied to the manufacturing apparatus while being wound as a roll. After that, when the first unwinding roll 10 is unwound, the base film 101 is supplied to the laminating portion 40.

The second unwinding roll 20 unwinds the heat sealing film 301. That is, the heat sealing film 301 is supplied to the manufacturing apparatus while being wound as a roll. After that, when the second unwinding roll 20 is unwound, the heat sealing film 301 is supplied to the embossing forming portion 21.

The third unwinding roll 30 unwinds the microfiber fabric sheet 401. That is, the microfiber fabric sheet 401 is supplied to the manufacturing apparatus while being wound as a roll. After that, when the third unwinding roll 30 is unwound, the microfiber fabric sheet 401 is supplied to the laminating portion 40.

The embossing forming portion 21 forms embossing on the heat sealing film 301 unwound from the second unwinding roll 20. That is, the embossing forming portion 21 forms at least one cleaning solution accommodating portion 500 able to contain the cleaning solution on the heat sealing film 301.

After that, the perforating portion 22 forms a plurality of through holes 310 in the heat sealing film 301. The through hole 310 may be formed corresponding to an area in which the cleaning solution accommodating portion 500 is formed. The perforating portion 22 may form the through hole 310 in the heat sealing film 301 using a laser.

Unlike this, the perforating portion 22 may form the through hole 310 using a mechanical method. For example, the perforating portion 22 may include a sharp and pointed needle. The perforating portion 22 may form the through hole 310 using the needle.

Accordingly, as shown in FIGS. 27 and 28, the cleaning solution accommodating portion 500 and the through hole 310 may be formed in the heat sealing film 301.

Unlike this, the perforating portion may be omitted. When the perforating portion is omitted, the through hole may not be formed in the heat sealing film.

After that, the cleaning solution injection portion 23 injects the cleaning solution toward a top of the heat sealing film 301. The cleaning solution may be injected to the overall heat sealing film 301. Unlike this, the cleaning solution may be injected only to the cleaning solution accommodating portion 500 through an inkjet method.

Accordingly, as shown in FIG. 29, the cleaning solution accommodating portion 500 is filled with the cleaning solution. The cleaning solution is an aqueous solution, and the cleaning solution accommodating portion 500 may be filled with the cleaning solution when an inside of the cleaning solution accommodating portion 500 is hydrophilic-treated.

Unlike this, even when the cleaning solution is injected only to the cleaning solution accommodating portion 500, the cleaning solution accommodating portion 500 may be filled with the cleaning solution.

After that, as shown in FIG. 30, the base film 101 is disposed above the heat sealing film 301 and the microfiber fabric sheet 401 is disposed below the heat sealing film 301. After that, the heat sealing film 301, the base film 101, and the microfiber fabric sheet 401 are mutually thermally sealed by the laminating portion 40.

As shown in FIG. 31, the laminating portion 40 includes a thermocompression bonding pattern which applies heat and pressure. The thermocompression bonding pattern is a protrusion pattern protruding from a roll. The thermocompression bonding pattern applies heat and pressure to the heat sealing film 301, the base film 101, and the microfiber fabric sheet 401 at the same time. The thermocompression bonding pattern applies heat and pressure only to a selected area.

Accordingly, as shown in FIG. 32, the heat sealing film 301 is cohered with the base film 101 and the microfiber fabric sheet 401 in the selected area. That is, the heat sealing film 301 includes a joint area JA which is an area cohered with the base film 101 and the microfiber fabric sheet 401.

Also, the heat sealing film 301 includes a non-joint area NJA which is an area other than the joint area JA, that is, an area which is not cohered with the base film 101 and the microfiber fabric sheet 401. The joint area JA is formed corresponding to the thermocompression bonding pattern. Also, the joint area JA may surround the non-joint area NJA.

Also, a groove pattern and the protrusion pattern 410 are formed on the microfiber fabric sheet 401. The groove pattern is formed by the thermocompression bonding pattern. That is, a part of the microfiber fabric sheet 401, compressed by the thermocompression bonding pattern, is cohered with the joint area JA and simultaneously the groove pattern is formed.

Also, the protrusion pattern 410 is formed in an area other than the part in which the groove pattern is formed. Accordingly, together with the cohesion process, an uneven structure is formed on the microfiber fabric sheet 401.

As described above, the heat sealing film 301, the base film 101, and the microfiber fabric sheet 401 are cohered with together and form a laminated film. The laminated film is supplied to the blanking portion 50. The blanking portion 50 cuts the heat sealing film 301, the base film 101, and the microfiber fabric sheet 401 at the same time, thereby manufacturing the cleaning apparatus according to the embodiment.

The cleaning apparatus may be transferred and collected by the conveyor belt 70. Also, a residual part of the laminated film, which is not blanked, is wound by the winding roll 60.

As described above, the cleaning solution storage process, lamination process, and process for forming uneven portions on the microfiber fabric sheet are performed at one time. That is, through the lamination process, the cleaning solution is stored between the base film 101 and the heat sealing film 301. Also, through the lamination process, the uneven pattern is formed on the microfiber fabric sheet at the same time.

Accordingly, the cleaning apparatus according to the present embodiment may be easily formed through a simple process.

FIG. 33 is a top view of a cleaning apparatus for a mobile device according to a yet another embodiment of the present invention. FIG. 34 is a cross-sectional view of a part taken along line E-E' shown in FIG. 33. In a description for the present embodiment, the description for the embodiments described above will be referred to. That is, the description of the embodiments described above except changed parts may be intrinsically coupled with the description for the present embodiment.

As shown in FIGS. 33 and 34, the adhesive film 300 may include a first joint pattern portion JA1 and a second joint pattern portion JA2.

The first joint pattern portion JA1 is formed in the center of the adhesive film 300 and may be substantially identical to a joint pattern portion described above.

The second joint pattern portion JA2 is formed on a periphery of the adhesive film 300. That is, the second joint pattern portion JA2 extends along the periphery of the adhesive film 300. The second joint pattern portion JA2 may have a closed loop shape along the periphery of the adhesive film 300.

Accordingly, the second joint pattern portion JA2 may fundamentally prevent the cleaning solution from leaking from a side of the cleaning apparatus according to the present embodiment.

Also, the wiping layer 400 may have a low step on a periphery corresponding to the second joint pattern portion JA2. That is, the periphery of the wiping layer 400 is compressed by a thermocompression bonding process, thereby having a small thickness.

That is, at the second joint pattern portion JA2, the wiping layer 400 is compressed at a high temperature for a long time. Accordingly, fabric pieces included in the wiping layer 400 are mutually melted and strongly fused. Accordingly, it is possible to prevent fabric pieces in the periphery of the wiping layer 400 from being separated and polluting an outer surface of the mobile device.

Also, due to the small thickness, not nearly the periphery of the wiping layer 400 is in contact with the surface of the mobile device. Particularly, a contact with a harder part of the wiping layer 400 compressed by heat may be reduced. Accordingly, the cleaning apparatus according to the present embodiment may prevent pollution caused by fabric pieces and may prevent scratches which occur while cleaning.

FIG. 35 is a perspective view of the cleaning apparatus according to the embodiment of the present invention. FIG. 36 is an exploded perspective view of the cleaning apparatus according to the embodiment of the present invention. FIG. 37 is a top view illustrating a top surface of a cleaning solution accommodating portion. FIG. 38 is a perspective view illustrating a bottom surface of the cleaning solution accommodating portion. FIG. 39 is a top view illustrating the bottom surface of the cleaning solution accommodating portion. FIG. 40 is an enlarged view illustrating a part of the bottom surface of the cleaning solution accommodating portion. FIG. 41 is a cross-sectional view of a part taken along line F-F' shown in FIG. 35. FIG. 42 is a cross-sectional view of a part taken along line G-G' shown in FIG. 35. FIG. 43 is a view illustrating a process of injecting a cleaning solution into the cleaning apparatus according to the embodiment of the present invention. In a description for the present embodiment, the description for the embodiments described above will be referred to. That is, the description of the embodiments described above except changed parts may be intrinsically coupled with the description for the present embodiment.

Referring to FIGS. 35 to 43, the cleaning apparatus according to the present embodiment includes the supporting plate 100, a cleaning solution accommodating body 600, and the wiping layer 400.

Also, the supporting plate 100 supports the wiping layer 400. The supporting plate 100 has a plate shape.

In more detail, the supporting plate 100 may be formed by blanking a plastic film. The supporting plate 100 includes plastic.

The cleaning solution accommodating body 600 is disposed between the supporting plate 100 and the wiping layer 400. The cleaning solution accommodating body 600 may be cohered with a part of a top surface of the supporting plate 100. Also, the cleaning solution accommodating body 600 may be cohered with a part of a bottom surface of the wiping layer 400.

In more detail, the cleaning solution accommodating body 600 may be adhered to the bottom surface of the wiping layer 400.

The cleaning solution accommodating body 600 may include a thermoplastic resin. In more detail, the cleaning solution accommodating body 600 may include a silicone resin or a urethane resin. As an example of a material used for the cleaning solution accommodating body 600, there is a polydimethylsiloxane resin or a modified silicone urethane resin.

The cleaning solution accommodating body 600 may generally have a plate shape. A thickness of the cleaning solution accommodating body 600 may be from about 0.5 mm to about 3 mm.

As shown in FIGS. 37 to 43, the cleaning solution accommodating body 600 includes a body portion 610, a shutoff portion 620, and a protruding supporting portion 630. Also, the cleaning solution accommodating body 600 includes a cleaning solution accommodating portion capable of accommodating the cleaning solution. The cleaning solution accommodating portion may be formed as a groove shape by partially recessing the cleaning solution accommodating body 600. The cleaning solution accommodating portion includes a main cleaning solution accommodating groove 640, a guide groove 650, a sub cleaning solution accommodating groove 660, a through hole 670, and an injection hole 680.

The body portion 610 includes a main cleaning solution accommodating groove 640, a guide groove 650, a sub cleaning solution accommodating groove 660, a through hole 670, and an injection hole 680.

The body portion 610 generally forms the cleaning solution accommodating body 600. That is, the cleaning solution accommodating body 600 is formed almost by the body portion 610.

The main cleaning solution accommodating groove 640 is formed in the body portion 610. The main cleaning solution accommodating groove 640 may be located in the middle of the body portion 610 in a top view. A planar area of the main cleaning solution accommodating groove 640 may be from about ¼ to about ⅔ of a planar area of the body portion 610. In more detail, the planar area of the main cleaning solution accommodating groove 640 may be from about ⅓ to about ½ of the planar area of the body portion 610.

Also, the main cleaning solution accommodating groove 640 may face the supporting plate 100. The main cleaning solution accommodating groove 640 may be formed below the body portion 610. Accordingly, the supporting plate 100 may cover the main cleaning solution accommodating groove 640.

The guide groove 650 is formed in the body portion 610. The guide groove 650 may be located on a peripheral part of the body portion 610.

Also, the guide groove 650 may face the supporting plate 100. The guide groove 650 may be formed below the body portion 610. Accordingly, the supporting plate 100 may cover the guide groove 650.

The guide groove 650 extends from the main cleaning solution accommodating groove 640. The guide groove 650 is connected to the main cleaning solution accommodating groove 640. The guide groove 650 may extend from one side of the main cleaning solution accommodating groove 640 to the sub cleaning solution accommodating groove 660.

The sub cleaning solution accommodating groove 660 is formed in the body portion 610. The guide groove 660(650) may be located on the peripheral part of the body portion 610.

Also, the sub cleaning solution accommodating groove 660 may face the supporting plate 100. The sub cleaning solution accommodating groove 660 may be formed below the body portion 610. Accordingly, the supporting plate 100 may cover the sub cleaning solution accommodating groove 660.

The sub cleaning solution accommodating groove 660 may be disposed at an end of the guide groove 650. The sub cleaning solution accommodating groove 660 is connected to the guide groove 650. The guide groove 650 may have a shape which extends in one direction. One end of the guide groove 650 may be connected to the main cleaning solution accommodating groove 640 and the other end may be connected to the sub cleaning solution accommodating groove 660.

The supporting plate 100 is a cover portion which generally covers the main cleaning solution accommodating groove 640, the guide groove 650, and the sub cleaning solution accommodating groove 660. Also, the supporting plate 100 may be a sealing portion which seals the main cleaning solution accommodating groove 640, the guide groove 650, and the sub cleaning solution accommodating groove 660 from the outside.

Particularly, the supporting plate 100 may be adhered to the body portion 610 to seal the main cleaning solution accommodating groove 640, the guide groove 650, and the sub cleaning solution accommodating groove 660. For example, a peripheral part of the supporting plate 100 may be adhered to or cohered with the peripheral part of the body portion 610.

The through hole 670 penetrates the body portion 610. The through hole 670 extends to the sub cleaning solution accommodating groove 660. That is, the through hole 670 extends from the sub cleaning solution accommodating groove 660 to a top surface of the body portion 610. The through hole 670 may be formed to allow the cleaning solution contained in the sub cleaning solution accommodating groove 660 to be ejected to the wiping layer 400. That is, the through hole 670 is an ejection hole for allowing the cleaning solution stored in the sub cleaning solution accommodating groove 660 to be ejected to the wiping layer 400.

The through hole 670 may be formed corresponding to the sub cleaning solution accommodating groove 660. A diameter of the through hole 670 may be from about 0.01 mm to about 0.1 mm. The through hole 670 may be formed 1 to 5 in response to the sub cleaning solution accommodating groove 660.

The injection hole 680 is formed in the body portion 610. The injection hole 680 extends from the outside to the main cleaning solution accommodating groove 640. The injection hole 680 is a hole for allowing the cleaning solution to be injected into the main cleaning solution accommodating groove 640.

As shown in FIG. 43, the cleaning solution may be injected into the main cleaning solution accommodating groove 640 by an external injector 40 through the injection hole 680. Since the body portion 610 is formed of a resin having elasticity, a crack is not formed in the injection hole 680. When a needle of the injector 40 is inserted, the injection hole 680 gapes open.

The shutoff portion 620 extends from the body portion 610. The shutoff portion 620 is disposed between the guide groove 650 and the sub cleaning solution accommodating groove 660. The shutoff portion 620 may shut off the guide groove 650 from the sub cleaning solution accommodating groove 660. The shutoff portion 620 may segregate the guide groove 650 from the sub cleaning solution accommodating groove 660 at any preferable time. In more detail, the shutoff portion 620 may segregate the guide groove 650 from the sub cleaning solution accommodating groove 660 when external pressure is not applied to the cleaning solution accommodating body 600.

Hereby, the shutoff portion 620 selectively shuts off the sub cleaning solution accommodating groove 660 from the main cleaning solution accommodating groove 640.

The protruding supporting portion 630 extends from the body portion 610. The protruding supporting portion 630 is disposed between the guide groove 650 and the sub cleaning solution accommodating groove 660. The protruding supporting portion 630 may support the shutoff portion 620. The protruding supporting portion 630 may be in direct contact with the shutoff portion 620. Also, the protruding supporting portion 630 may be overlapped with the shutoff portion 620 when viewed from the guide groove 650. Also, parts of the protruding supporting portion 630 and the shutoff portion 620 mutually overlapped may be in contact with or very closed to each other.

Accordingly, the protruding supporting portion 630 may selectively shut off the sub cleaning solution accommodating groove 660 from the guide groove 650 together with the shutoff portion 620. When external pressure is not applied, the protruding supporting portion 630 and the shutoff portion 620 may be in direct contact with or very close to each other while the shutoff portion 620 is having elasticity. Accordingly, the sub cleaning solution accommodating groove 660 and the guide groove 650 may be mutually shut off.

Also, when pressure is applied to the cleaning solution accommodating body 600, pressure inside the main cleaning solution accommodating groove 640 and the guide groove 650 increases. Accordingly, the protruding supporting portion 630 and the shutoff portion 620 is spaced apart from each other. Accordingly, the sub cleaning solution accommodating groove 660 and the guide groove 650 may be mutually connected.

The cleaning solution accommodating body 600 may be formed using an injection molding process. That is, a thermoplastic resin is injected into a mold having a shape corresponding to the cleaning solution accommodating body 600 and is cooled, thereby forming the cleaning solution accommodating body 600. The cleaning solution accommodating body 600 may be formed plurally at one time.

Here, the protruding supporting portion 630 and the shutoff portion 620 may be integrally formed in the injection molding process and may be mutually divided by a knife and the like. Accordingly, when external pressure is not applied, the protruding supporting portion 630 and the shutoff portion 620 may be in contact with each other.

The wiping layer 400 is disposed above the cleaning solution accommodating body 600. In more detail, the wiping layer 400 may be adhered to a top surface of the cleaning solution accommodating body 600. The wiping layer 400 may be adhered to the top surface of the cleaning solution accommodating body 600 using an adhesive or a heat sealing film. Here, the adhesive or the heat sealing film may have a structure in which a part corresponding to the through hole 670 is open not to block the through hole 670. That is, a part of the cleaning solution accommodating body 600 corresponding to the through hole 670 may be opposite to or in direct contact with the wiping layer 400.

Also, since the supporting plate 100 and the cleaning solution accommodating body 600 have appropriate elasticity, the cleaning apparatus according to the present embodiment may allow the wiping layer 400 to be in entire contact with the screen of the mobile device. Accordingly, the cleaning apparatus according to the present embodiment may efficiently clean the screen of the mobile device.

The cleaning solution is contained in the main cleaning solution accommodating groove 640. Also, the cleaning solution is contained inside the guide groove 650. Also, the cleaning solution may be contained in the sub cleaning solution accommodating groove 660. That is, the cleaning solution is contained between the cleaning solution accommodating body 600 and the supporting plate 100.

After that, pressure may be externally applied to the cleaning solution accommodating body 600 by the finger and the like through the supporting plate 100. Accordingly, pressure inside the main cleaning solution accommodating groove 640 and the guide groove 650 increases. Accordingly, a space between the shutoff portion 620 and the sub cleaning solution accommodating groove 660 gapes open and then the cleaning solution inside the sub cleaning solution accommodating groove 660 is ejected to the wiping layer 400 through the through hole 670.

That is, the cleaning solution accommodating body 600 and the supporting plate 100 may contain the cleaning solution, and the cleaning solution may outpour to the wiping layer 400 through the through hole 670. In more detail, due to the pressure from the finger of the user, the cleaning solution may outpour to the wiping layer 400 to wet the wiping layer 400.

Accordingly, the cleaning apparatus according to the embodiment may wipe the outside of the mobile device using the cleaning solution which outpours due to the pressure of the finger and the wet wiping layer 400 while wiping the outside of the mobile device.

Also, when external pressure is not present, the shutoff portion 620 and the protruding supporting portion 630 segregate the sub cleaning solution accommodating groove 660 from the guide groove 650. The shutoff portion 620 is disposed on a path through which the cleaning solution is moved from the main cleaning solution accommodating groove 640 to the sub cleaning solution accommodating groove 660. At last, when the cleaning apparatus according to the present embodiment is not used, the shutoff portion 620 segregates the sub cleaning solution accommodating groove 660 from the guide groove 650 and the main cleaning solution accommodating groove 640.

Accordingly, the shutoff portion 620 and the protruding supporting portion 630 may prevent the cleaning solution inside the guide groove 650 and the main cleaning solution accommodating groove 640 from evaporating. Particularly, an interval between the shutoff portion 620 and the protruding supporting portion 630 is very small to prevent a capillary phenomenon, thereby preventing a phenomenon of outpouring the cleaning solution inside the main cleaning solution accommodating groove 640 and the guide groove 650.

Accordingly, the cleaning apparatus according to the present embodiment may be used for a long time even though accommodating a small amount of the cleaning solution.

FIG. 44 is a cross-sectional view of a cleaning apparatus according to even another embodiment of the present invention. In a description for the cleaning apparatus according to the present embodiment, the description for the cleaning apparatus described above will be referred to. That is, the description of the embodiments described above except changed parts may be intrinsically coupled with the description for the present embodiment.

Referring to FIG. 44, the wiping layer 400 is disposed adjacently to a cover portion 100. In more detail, the wiping layer 400 may be joined or adhered to the cover portion 100. In more detail, the wiping layer 400 may be joined or adhered to a bottom surface of the cover portion 100.

The cover portion 100 includes a through hole 170. Accordingly, a cleaning solution contained in a sub cleaning solution accommodating groove 260 may be ejected to the wiping layer 400 through the through hole 170.

The cover portion 100 has a film shape, and the wiping layer 400 has a fabric sheet shape, thereby being easily joined to each other. After that, the cover portion 100 and the wiping layer 400 are formed through one cutting process, for example, a blanking process. After that, the cover portion 100 and the wiping layer 400 may be easily joined to a cleaning solution accommodating body 200(500?).

Accordingly, the cleaning apparatus according to the present embodiment may be easily manufactured. Also, since the wiping layer 400 is strongly joined to the cover portion 100, it is possible to prevent a phenomenon in which the wiping layer 400 is delaminated from the cleaning solution accommodating body 200(500?).

FIG. 45 is a perspective view illustrating a bottom surface of a cleaning solution accommodating body according to a further embodiment of the present invention. FIG. 46 is a cross-sectional view of a part taken along line H-H' shown in FIG. 45. FIG. 47 is a cross-sectional view illustrating a state of applying pressure to a cleaning apparatus according to another embodiment of the present invention. In a description for the cleaning apparatus according to the present embodiment, the description for the cleaning apparatus described above will be referred to. That is, the description of the embodiments described above except changed parts may be intrinsically coupled with the description for the present embodiment.

Referring to FIGS. 45 to 47, a cleaning solution accommodating portion 601 includes one or more main cleaning solution accommodating grooves 640. The main cleaning solution accommodating grooves 640 may be mutually segregated. Here, a first shutoff portion 621 may be disposed between the main cleaning solution accommodating grooves 640. The main cleaning solution accommodating grooves 640 may be divided by the first shutoff portion 621.

The sub cleaning solution accommodating groove 660 is segregated from the main cleaning solution accommodating grooves 640. The sub cleaning solution accommodating groove 660 may be formed next to an area in which the main cleaning solution accommodating grooves 640 are formed. Unlike this, the sub cleaning solution accommodating groove 660 may be disposed between the main cleaning solution accommodating grooves 640.

A second shutoff portion 622 may be disposed between the sub cleaning solution accommodating groove 660 and the main cleaning solution accommodating grooves 640. The sub cleaning solution accommodating groove 660 and the main cleaning solution accommodating grooves may be mutually divided by the second shutoff portion 622.

That is, the main cleaning solution accommodating grooves 640 and the sub cleaning solution accommodating groove 660 may be mutually spaced apart and may have an island shape. That is, the main cleaning solution accommodating grooves 640 and the sub cleaning solution accommodating groove 660 may be mutually spaced apart by the first shutoff portion 621 and the second shutoff portion 622.

The body portion 610 may be adhered to or cohered with the supporting plate 100. Here, a part or the whole of the first shutoff portion 621 is in contact with the supporting plate 100 without being adhered thereto or cohered therewith. Here, a part or the whole of the second shutoff portion 622 is in contact with the supporting plate 100 without being adhered thereto or cohered therewith. For example, only a peripheral part of the body portion 610 may be adhered to or cohered with the supporting plate 100.

Accordingly, as shown in FIG. 46, when external pressure is not applied, the first shutoff portion 621 and the second shutoff portion 622 are in contact with the supporting plate 100.

As shown in FIG. 47, when pressure is externally applied, a gap occurs between the first shutoff portion 621 and the supporting plate 100. Also, when pressure is externally applied, a gap occurs between the second shutoff portion 622 and the supporting plate 100.

That is, when pressure is applied to the supporting plate 100 by the finger and the like, pressure to the main cleaning solution accommodating grooves 640 increases. Here, since a part except the through hole 670 is sealed, the increasing pressure of the main cleaning solution accommodating grooves 640 may escape through the through hole 670.

Accordingly, the gap occurs between the supporting plate 100 and the first shutoff portion 621 and the gap occurs between the supporting plate 100 and the second shutoff portion 622. Also, the cleaning solution contained in the main cleaning solution accommodating grooves 640 flows into the sub cleaning solution accommodating groove 660 through the gaps. At last, the cleaning solution which flows into the sub cleaning solution accommodating groove 660 may be ejected to the wiping layer 400 through the through hole 670.

As described above, when the cleaning apparatus according to the present embodiment is not used, it is possible to shut off the main cleaning solution accommodating grooves 640 from the outside using the second shutoff portion 622. Accordingly, the cleaning apparatus according to the present embodiment may prevent the evaporation of the stored cleaning solution and may maintain improved cleaning performance for a long time.

FIG. 48 is an exploded perspective view of a cleaning apparatus according to still further embodiment of the present invention. FIG. 49 is a perspective view of the cleaning apparatus for a mobile device according to the present embodiment. FIG. 50 is a top view illustrating a bottom surface of a first sealing portion. FIG. 51 is a top view illustrating a top surface of a second sealing portion. FIG. 52 is a top view illustrating a joint area and a non-joint area. FIG. 53 is an enlarged top view of a flow control line and a sub cleaning solution accommodating portion. FIG. 54 is a cross-sectional view of a part taken along line I-I' shown in FIG. 52. FIG. 55 is a cross-sectional view of a part taken along line J-J' shown in FIG. 52. FIG. 56 is a detailed view of the first sealing portion and the second sealing portion in the joint area. FIG. 57 is a top view of a cleaning apparatus for a mobile device according to a yet further embodiment of the present invention. FIG. 58 is a top view of a cleaning apparatus for a mobile device according to an even further embodiment of the present invention. FIG. 59 is a top view of a flow control line according to another embodiment of the present invention. FIG. 60 is a top view of a flow control line according to still another embodiment of the present invention. FIG. 61 is a top view of a flow control line according to yet another embodiment of the present invention. FIG. 62 is a top view of a flow control line according to even another embodiment of the present invention. FIG. 63 is a view illustrating a process of manufacturing the cleaning apparatus for the mobile device according to the present embodiment. In a description for the cleaning apparatus according to the present embodiment, the description for the cleaning apparatus described above will be referred to. That is, the description of the embodiments described above except changed parts may be intrinsically coupled with the description for the present embodiment.

Referring to FIGS. 48 to 63, the cleaning apparatus for the mobile device according to the embodiment includes a first sealing portion 200, a second sealing portion 300, and the wiping layer 400.

The first sealing portion 200 is disposed above the second sealing portion 300. The first sealing portion 200 is opposite to the second sealing portion 300.

The first sealing portion 200 is partially cohered with the second sealing portion 300. In more detail, a part of the first sealing portion 200 may be cohered with a part of the second sealing portion 300. In more detail, a periphery of the first sealing portion 200 may be directly cohered with a periphery of the second sealing portion 300. The first sealing portion 200 and the second sealing portion 300 may be mutually joined through a thermally joining process or an ultrasonic joining process.

As shown in FIG. 50, the first sealing portion 200 includes a first joint portion 220 and a first non-joint portion 230.

The first joint portion 220 may be disposed on the periphery of the first sealing portion 200. The first joint portion 220 may extend along the periphery of the first sealing portion 200. The first joint portion 220 may have a closed loop shape. The first joint portion 220 may extend along a periphery of the first non-joint portion 230. In more detail, the first joint portion 220 may totally surround the first non-joint portion 230.

The first non-joint portion 230 may be disposed in the center of the first sealing portion 200. The first non-joint portion 230 may be disposed inside the first joint portion 220. The first non-joint portion 230 may be surrounded by the first joint portion 220.

The first joint portion 220 is cohered with the second sealing portion 300. The first joint portion 220 may be directly cohered with the second sealing portion 300. A bottom surface of the first joint portion 220 may be directly cohered with a top surface of the second sealing portion 300.

The first non-joint portion 230 is not cohered with the second sealing portion 300. Accordingly, the first non-joint portion 230 may be spaced from the second sealing portion 300. That is, a space may be formed between the first non-joint portion 230 and the second sealing portion 300.

The first sealing portion 200 may have various plane shapes. The first sealing portion 200 may have a rectangular plane shape in a top view. The first sealing portion 200 may have a bottle shaped plane in a top view. The first sealing portion 200 may have a circle or oval shaped plane in a top view. Also, the first sealing portion 200 may have various plane shapes such as several animal shapes or a bottle shape.

The first sealing portion 200 may be flexible. The first sealing portion 200 may include a thermoplastic resin. In more detail, the first sealing portion 200 may include a polypropylene resin, a polyamide resin, a polyurethane resin, an ethylenevinylacetate resin, or a polyester resin. In more detail, the first sealing portion 200 may be a thin plastic film. In more detail, the first sealing portion 200 may include a polyethyleneterephthalate (PET) film, a polyethylene (PE) film, or a polyvinylchloride (PVC) film.

Also, as shown in FIG. 56, the first sealing portion 200 may have a multilayer structure. The first sealing portion 200 includes a first base film 201 and a first heat sealing layer 202.

The first heat sealing layer 202 is joined to the first base film 201. In more detail, the first heat sealing layer 202 may be laminated to the first base film 201. In more detail, the first base film 201 and the first heat sealing layer 202 may be formed through a coextrusion process.

The first heat sealing layer 202 may be joined to a bottom surface of the first base film 201. In more detail, the first heat sealing layer 202 may be directly adhered to the bottom surface of the first base film 201.

The first heat sealing layer 202 may have a lower melting point than the first base film 201. Also, the first heat sealing layer 202 may have a lower glass transition temperature than the first base film 201.

Accordingly, the first heat sealing layer 202 may have adhesive properties due to external heat. When heat is locally applied to the first heat sealing layer 202, the first heat sealing layer 202 may selectively have adhesive properties.

The first base film 201 may include a polyvinylchloride resin or a polyethyleneterephthalate resin, and the first heat sealing layer 202 may include a polyethylene resin.

Also, a printing layer which displays information may be further formed on a top surface of the first sealing portion 200. A picture or text may be printed on the printing layer.

Also, the first sealing portion 200 may have a single layer or multilayer structure. The first sealing portion 200 may further include a metal layer in addition to a plastic film. For example, the first sealing portion 200 may have a three-layer structure formed of a plastic film/metal layer/plastic film.

The second sealing portion 300 is disposed below the first sealing portion 200. The second sealing portion 300 is opposite to the first sealing portion 200.

The second sealing portion 300 is partially cohered with the first sealing portion 200. In more detail, the part of the second sealing portion 300 may be cohered with the part of the first sealing portion 200. In more detail, the periphery of the second sealing portion 300 may be directly cohered with the periphery of the first sealing portion 200.

As shown in FIG. 51, the second sealing portion 300 includes a second joint portion 210, a second non-joint portion 220, and the through hole 310.

The second joint portion 210 may be disposed on the periphery of the second sealing portion 300. The second joint portion 210 may extend along the periphery of the second sealing portion 300. The second joint portion 210 may have a closed loop shape. The second joint portion 210 may extend along a periphery of the second non-joint portion 220. In more detail, the second joint portion 210 may totally surround the second non-joint portion 220.

The second non-joint portion 220 may be disposed in the center of the first sealing portion 300. The second non-joint portion 220 may be disposed inside the second joint portion 210. The second non-joint portion 220 may be surrounded by the second joint portion 210.

The second joint portion 210 is cohered with the first sealing portion 200. The second joint portion 210 may be directly cohered with the first sealing portion 200. A top surface of the second joint portion 210 may be directly cohered with a bottom surface of the first sealing portion 200.

Also, the second joint portion 210 is cohered with the first joint portion 220. The second joint portion 210 corresponds to the first joint portion 220. That is, the second joint portion 210 has a plane shape substantially identical to the first joint portion 220 and directly faces the same. That is, the second joint portion 210 is identically overlapped with the first joint portion 220.

The second non-joint portion 220 is not cohered with the first sealing portion 200. Accordingly, the second non-joint portion 220 may be spaced from the first sealing portion 200. That is, a space may be formed between the second non-joint portion 220 and the first sealing portion 200.

The second non-joint portion 220 faces the first non-joint portion 230. Also, the second non-joint portion 220 corresponds to the first non-joint portion 230. The second non-joint portion 220 has a plane shape substantially identical to the first non-joint portion 230.

The through hole 310 penetrates the second sealing portion 300. The through hole 310 is formed in the second non-joint portion 220. The through hole 310 extends from a space between the first sealing portion 200 and the second sealing portion 300 to the wiping layer 400.

In the drawings, the number of the through holes 310 is two but is not limited thereto. For example, the number of the through hole 310 may be one or three or more.

The second sealing portion 300 may have various plane shapes. The plane shape of the second sealing portion 300 may be substantially identical to that of the first sealing portion 200.

The second sealing portion 300 may be flexible. The first sealing portion 200 (한글 394 제1봉지부가 아니라 제2 봉지부가 아닌지 확인) may include a thermoplastic resin. In more detail, the first sealing portion 200 may include a polypropylene resin, a polyamide resin, a polyurethane resin, an ethylenevinylacetate resin, or a polyester resin. In more detail, the second sealing portion 300 may be a thin plastic film. In more detail, the second sealing portion 300 may include a polyethyleneterephthalate (PET) film, a polyethylene (PE) film, or a polyvinylchloride (PVC) film.

Also, as shown in FIG. 55, the second sealing portion 300 may have a multilayer structure. The second sealing portion 300 includes a second base film 301 and a second heat sealing layer 302.

The second heat sealing layer 302 is joined to the second base film 301. In more detail, the second heat sealing layer 302 may be laminated to the second base film 301. In more detail, the second base film 301 and the second heat sealing layer 302 may be formed through a coextrusion process.

The second heat sealing layer 302 may be joined to a top surface of the second base film 301. In more detail, the second heat sealing layer 302 may be directly adhered to the top surface of the second base film 301.

The second heat sealing layer 302 may have a lower melting point than the second base film 301. Also, the second heat sealing layer 302 may have a lower glass transition temperature than the second base film 301.

Accordingly, the second heat sealing layer 302 may have adhesive properties due to external heat. When heat is locally applied to the second heat sealing layer 302, the second heat sealing layer 302 may selectively have adhesive properties.

The second base film 301 may include a polyvinylchloride resin or a polyethyleneterephthalate resin, and the second heat sealing layer 302 may include a polyethylene resin.

The first base film 201 and the second base film 301 are opposite to each other. Also, the first base film 201 and the second base film 301 face each other while interposing the first heat sealing layer 202 and the second heat sealing layer 302 therebetween.

Also, the first heat sealing layer 202 and the second heat sealing layer 302 are locally thermally cohered with each other. Accordingly, the first sealing portion 200 and the second sealing portion 300 are thermally sealed to each other.

Also, a printing layer which displays information may be further formed on a bottom surface of the second sealing portion 300. A picture or text may be printed on the printing layer.

Also, the second sealing portion 300 may have a single layer or multilayer structure. The second sealing portion 300 may further include a metal layer in addition to a plastic film. For example, the second sealing portion 300 may have a three-layer structure formed of a plastic film/metal layer/plastic film.

Thicknesses of the first sealing portion 200 and the second sealing portion 300 may be from about 0.01 mm to about 0.5 mm. In more detail, the thicknesses of the first sealing portion 200 and the second sealing portion 300 may be from about 0.01 mm to about 0.1 mm. Also, as described above, since having a film shape, the first sealing portion 200 and the second sealing portion 300 may be a first sealing film and a second sealing film, respectively.

The first sealing portion 200 and the second sealing portion 300 are cohered with each other, thereby forming the cleaning apparatus. That is, the first sealing portion 200 and the second sealing portion 300 may be cohered with each other, thereby forming the cleaning apparatus which may contain and eject the cleaning solution therein.

The cleaning apparatus for the mobile device, which is formed by the first sealing portion 200 and the second sealing portion 300, has a size easily carried by the user. In more detail, the cleaning apparatus may have a shape which longitudinally extends.

As shown in FIGS. 53 to 63, the first sealing portion 200 and the second sealing portion 300 are cohered with each other, thereby defining a joint area LA and a non-joint area NLA in the cleaning apparatus. The joint area LA is an area in which the first sealing portion 200 and the second sealing portion 300 are cohered with each other, and the non-joint area NLA is an area in which the first sealing portion 200 and the second sealing portion 300 are not cohered with each other but spaced from each other.

In the non-joint area NLA, between the first sealing portion 200 and the second sealing portion 300, the cleaning solution accommodating portion 500, the ejection pressure applying portion 510, the flow control line 520, and the temporary storage portion 530 are formed. In more detail, the cleaning solution accommodating portion 500, the flow control line 520, and the temporary storage portion 530 are formed between the first non-joint portion 230 and the second non-joint portion 220.

The cleaning solution accommodating portion 500 occupies the greater part of the non-joint area NLA. The cleaning solution accommodating portion 500 is disposed in the center of the first sealing portion 200. Likewise, the cleaning solution accommodating portion 500 is disposed in the center of the second sealing portion 300.

The cleaning solution accommodating portion 500 is surrounded by the joint area LA. That is, the joint area LA may extend along the periphery of the cleaning solution accommodating portion 500.

As shown in FIGS. 50 to 57, the ejection pressure applying portion 510 is formed between the cleaning solution accommodating portion 500 and the through hole 330. The ejection pressure applying portion 510 may be defined by an area in which the first sealing portion and the second sealing portion are joined to each other.

The ejection pressure applying portion 510 extends from the cleaning solution accommodating portion 500 to the temporary storage portion 530. Here, the flow control line 520 may be disposed between the ejection pressure applying portion 510 and the temporary storage portion 530. That is, the flow control line 520 may extend from the ejection pressure applying portion 510 to the temporary storage portion 530.

A width of the ejection pressure applying portion 510 may be greater than a width of the flow control line 520. For example, the width of the ejection pressure applying portion 510 may be from about 3 mm to about 15 mm.

The ejection pressure applying portion 510 guides the cleaning solution contained in the cleaning solution accommodating portion 500 to the temporary storage portion 530. Accordingly, the user may force the cleaning solution contained in the cleaning solution accommodating portion 500 to the temporary storage portion 530 through the ejection pressure applying portion 510 by a simple operation using the finger and the like.

Particularly, when the cleaning solution is a gel type having a high viscosity, the user may easily eject the cleaning solution through the ejection pressure applying portion 510.

As shown in FIGS. 50 to 57, the flow control line 520 is disposed at one side of the cleaning solution accommodating portion 500. The flow control line 520 extends from the ejection pressure applying portion 510.

A description of the ejection pressure applying portion 510 and the flow control line 520 may refer to the description of the embodiments described above.

Although not shown in the drawings, a temporary shutoff portion may be formed in the ejection pressure applying portion 510 and/or the flow control line 520. That is, the temporary shutoff portion may be formed by temporarily sticking or adhering the first sealing portion 200 and the second sealing portion 300 to each other. The temporary shutoff portion may have a configuration substantially identical to the temporary shutoff portion in the embodiments described above.

Also, as shown in FIG. 58, the joint area LA may further include a separating portion 21. The separating portion 21 is formed by joining the first sealing portion 200 and the second sealing portion 300 to each other.

The separating portion 21 is formed around the through hole 310. In more detail, the separating portion 21 surrounds the through hole 310. In more detail, the separating portion 21 partially surrounds the through hole 310 to form the flow control line 21.

The cleaning solution accommodating portion 500 and the temporary storage portion 530 are separated from the non-joint area NLA by the separating portion 21. That is, the temporary storage portion 530 is defined by the separating portion 21. The temporary storage portion 530 is an area inside the separating portion 21.

An amount of the cleaning solution which flows into the temporary storage portion 530 may be appropriately controlled by the separating portion 21. Accordingly, an appropriate amount of the cleaning solution may be ejected at a time preferred by the user.

The wiping layer 400 is attached to the second sealing portion 300. In more detail, the wiping layer 400 may be adhered to the second sealing portion 300. In more detail, the wiping layer 400 may be adhered to the second sealing portion 300 through a heat sealing process. That is, an adhesive film (not shown) or an adhesive layer (not shown) may intervene between the wiping layer 400 and the second sealing portion 300. Here, the adhesive film or the adhesive layer includes an exposing area which exposes the through hole 310.

The wiping layer 400 may be directly joined to the second sealing portion 300. The wiping portion may be joined to the second sealing portion 300 through thermally joining or ultrasonic joining.

As shown in FIGS. 54 and 55, the cleaning solution 50 is contained between the first sealing portion 200 and the second sealing portion 300. In more detail, the cleaning solution is contained in the non-joint area NLA. In more detail, the cleaning solution 50 is generally contained in the cleaning solution accommodating portion 500. The cleaning solution 50 may be partially contained in the flow control line 520 and the temporary storage portion 530. An overall thickness of the cleaning apparatus which contains the cleaning solution 50 may be about 3 mm or less. In more detail, the thickness of the cleaning apparatus which contains the cleaning solution may be from about 1 mm to about 2 mm. In more detail, the thickness of the cleaning apparatus which contains the cleaning solution may be from about 1 mm to about 3 mm. Also, with respect to the height of the cleaning solution accommodating portion 500 refers to the description of the embodiments described above.

After that, the cleaning solution 50 in the temporary storage portion 530 is ejected to the wiping layer 400 through the through hole 310. The cleaning solution ejected to the wiping layer 400 wets the wiping layer 400.

Accordingly, the wiping layer 400 wet by the cleaning solution may effectively wipe the screen of the mobile device or the monitor.

Particularly, as shown in FIGS. 59 to 62, ejection control portions 521, 522, 523, 524, and 525 for controlling an ejection amount from the cleaning solution accommodating portion 500 may be formed in the flow control line 520. The ejection control portions 521, 522, 523, 524, and 525 may be formed by joining the first sealing portion 200 to the second sealing portion 300 in the flow control line 520.

As shown in FIGS. 59 and 60, the ejection control portions 521 and 522 may have an island shape. Here, the ejection control portions 21 and 22 may be parts formed by joining the first sealing portion 200 and the second sealing portion 300 to each other in an island shape.

As shown in FIG. 59, the ejection control portion 521 may have a dot shape, and more particularly, may have a circular or oval shape. That is, the ejection control portion 521 may be formed by spacing a plurality of dots from one another.

Also, as shown in FIG. 60, the ejection control portion 522 may have a polygonal plane shape. That is, the ejection control portion 522 may be formed by spacing a plurality of polygons from one another.

Also, as shown in FIG. 61, the ejection control portion 523 may have a shape which extends in a direction in which the flow control line 520 extends. That is, the ejection control portion 523 may extend in the same direction as the flow control line 520. Also, the ejection control portion 523 may be a plurality of patterns which extend in parallel.

Also, as shown in FIG. 62, the ejection control portions 524 and 525 may extend in directions which intersect with the flow control line 520. Angles between the directions in which the ejection control portions 524 and 525 extend and the direction in which the flow control line 520 extends may be from about 90° to about 150°.

Also, the ejection control portions 524 and 525 may include a first guide portion 524 and a second guide portion 525. The first guide portion 524 and the second guide portion 525 may be alternately arranged. Also, the first guide portion 524 and the second guide portion 525 may be mutually spaced.

The first guide portion 524 may extend from one side of the flow control line 520 to the other side. Here, the first guide portion 524 may be in direct contact with the one side of the flow control line 520 and may be spaced from the other side.

Also, the second guide portion 525 may extend from the other side of the flow control line 520 to the one side. Also, the second guide portion 525 may be in direct contact with the other side of the flow control line 520 and may be spaced from the one side.

As described above, a path from the cleaning solution accommodating portion 500 to the temporary storage portion 530 may become longer by the ejection control portion. Accordingly, the evaporation of the cleaning solution contained in the cleaning solution accommodating portion 500 may be reduced. At last, the cleaning apparatus according to the embodiment may have improved cleaning ability for a long time.

The cleaning apparatus for the mobile device according to the present embodiment may be manufactured through a following process.

First, a first sealing film and a second sealing film are provided. The first sealing film and the second sealing film are opposite to each other.

After that, the first sealing film and the second sealing film are mutually thermally compressed. Here, a part of the first sealing film and a part of the second sealing film are thermally compressed. That is, the first sealing film and the second sealing film may be joined to each other to form the joint area LA. Also, the first sealing film and the second sealing film are not mutually compressed in an area in which the non-joint area NLA is formed.

After that, the cleaning solution is injected into the non-joint area NLA. The cleaning solution may be injected using a nozzle of an injector. Also, a process of joining the first sealing film to the second sealing film may be performed through two stages. That is, except an area into which the cleaning solution is injected, the first sealing film and the second sealing film are thermally joined to each other. After that, after the cleaning solution is injected, the non-joint area NLA may be sealed through an additional joining process.

After that, the through hole 310 is formed in the second sealing film. The through hole 310 may be formed using a needle and the like. The through hole 310 may be previously formed before the joining process.

After that, the wiping layer 400 may be attached to cover the through hole 310.

After that, as shown in FIG. 63, the first sealing film and the second sealing film are cut at the same time, thereby forming the cleaning apparatus for the mobile device according to the present embodiment. Here, since the first sealing film and the second sealing film are cut at the same time, sides of the first sealing portion 200 and sides of the second sealing portion 300 may flush with each other. That is, the first sealing portion 200 and the second sealing portion 300 may include cross sections arranged on the same plane.

The printing layer displays various types of information such as advertisement copies, phone numbers, position information and images. The information may be printed and displayed on the top surface of the first sealing portion 200 or the bottom surface of the second sealing portion 300. Accordingly, the cleaning apparatus for the mobile device according to the present embodiment may be used as promotional items.

Also, features, structures, effects, etc. described in the above embodiments are included in at least one embodiment but are not limited to the one embodiment. In addition, features, structures, effects, etc. described in the respective embodiments may be executed by a person of ordinary skill in the art while being combined or modified with respect to other embodiments. Accordingly, it will be understood that contents related the combination and modification will be included in the scope of the present invention.

It should be understood that the exemplary embodiments described therein should be considered in a descriptive sense only and not for purposes of limitation. It will be understood by those of ordinary skill in the art that various changes in form and details which are not shown above may be made therein without departing from the essential features of the embodiments. For example, respective components shown in detail in the embodiments may be executed while being modified. Also, it will be understood that differences related to the modification and application are included in the scope of the present invention as defined by the following claims.

The invention claimed is:

1. A cleaning apparatus for a mobile device, comprising:
   a supporting plate;
   a sealing layer joined below the supporting plate; and
   a wiping layer disposed below the sealing layer,
   wherein a cleaning solution accommodating portion which contains a cleaning solution is formed between the supporting plate and the sealing layer,
   wherein the sealing layer comprises a through hole which extends to the wiping layer, and
   wherein the cleaning solution is ejected to the wiping layer through the through hole,
   wherein the cleaning solution accommodating portion comprises two or more cleaning solution accommodating grooves independently divided from one another, and
   wherein the respective cleaning solution accommodating grooves independently eject the cleaning solution to the wiping layer.

2. The cleaning apparatus of claim 1, wherein the sealing layer is a heat sealing film.

3. The cleaning apparatus of claim 1,
   wherein the wiping layer comprises fabric which absorbs the cleaning solution, and
   wherein the supporting plate, having high flexural elasticity, supports the sealing layer and the wiping layer.

4. The cleaning apparatus of claim 1, wherein a joint portion is formed by directly or indirectly joining the supporting plate and the sealing layer to each other.

5. The cleaning apparatus of claim 4, wherein a part of the joint portion is formed through a first joining process, and another part of the joint portion is formed through a second joining process.

6. The cleaning apparatus of claim 1, wherein a joint portion is formed by directly or indirectly joining the supporting plate and the sealing layer to each other, and
wherein the joint portion extends along a periphery of the cleaning solution accommodating portion.

7. The cleaning apparatus of claim 6,
wherein an average height of the cleaning solution accommodating portion is from 0.5 mm to 2 mm; and
wherein a viscosity of the cleaning solution is from about 10 cps to about 1000 cps.

8. The cleaning apparatus of claim 7, wherein the joint portion comprises a first joint portion which surrounds the cleaning solution accommodating portion, a second joint portion which extends from the first joint portion, and a third joint portion which is spaced from the second joint portion and extends from the first joint portion,
wherein an ejection pressure applying portion which extends from the cleaning solution accommodating portion to the through hole is formed between the second joint portion and the third joint portion,
wherein a width of the ejection pressure applying portion is from 0.5 cm to 3 cm, and
wherein a length of the ejection pressure applying portion is from 0.5 cm to 5 cm.

9. A cleaning apparatus for a mobile device, comprising:
a first sealing layer;
a second sealing layer disposed below the first sealing layer; and
a wiping layer attached to the second sealing layer,
wherein a cleaning solution accommodating portion is formed between the first sealing layer and the second sealing layer,
wherein the second sealing layer comprises a through hole through which a cleaning solution contained in the cleaning solution accommodating portion is ejected to the wiping layer,
wherein a second joint portion and a third joint portion are formed by mutually joining the first sealing layer and the second sealing layer,
wherein an ejection pressure applying portion which extends from the cleaning solution accommodating portion to the through hole is formed between the second joint portion and the third joint portion,
wherein a width of the ejection pressure applying portion is from 0.5 cm to 3 cm,
wherein a length of the ejection pressure applying portion is from 0.5 cm to 5 cm,
wherein the first sealing layer and the second sealing layer are in contact with or stuck to each other to form a temporary shutoff portion at the ejection pressure applying portion, and
wherein the temporary shutoff portion temporarily shuts off a movement of the cleaning solution from the cleaning solution accommodating portion to the through hole.

10. The cleaning apparatus of claim 9, wherein a first joint portion which extends along a periphery of the cleaning solution accommodating portion is formed,
wherein the second joint portion extends from the first joint portion, and
wherein the third joint portion is spaced from the second joint portion and extends from the first joint portion.

11. The cleaning apparatus of claim 10, wherein a fourth joint portion which extends from the second joint portion and a fifth joint portion which extends from the third joint portion and is spaced from the fourth joint portion are formed,
wherein a flow control line which extends from the ejection pressure applying portion to the through hole is formed between the fourth joint portion and the fifth joint portion,
wherein a width of the flow control line is smaller than the width of the ejection pressure applying portion, and
wherein the temporary shutoff portion is also formed in the flow control line.

12. The cleaning apparatus of claim 9, further comprising a supporting plate which is disposed above the first sealing layer and supports the first sealing layer and the second sealing layer.

13. A cleaning apparatus for a mobile device, comprising:
a first sealing layer;
a second sealing layer disposed below the first sealing layer; and
a wiping layer disposed below the second sealing layer,
wherein a joint portion is formed by directly or indirectly joining the first sealing layer to the second sealing layer,
wherein a cleaning solution accommodating portion which contains a cleaning solution is formed in an area surrounded by the joint portion between the first sealing layer and the second sealing layer,
wherein the second sealing layer comprises a through hole for ejecting the cleaning solution to the wiping layer,
wherein an average height of the cleaning solution accommodating portion is from 0.05 mm to 2 mm, and
wherein a viscosity of the cleaning solution is from 10 cps to 1000 cps,
wherein the joint portion comprises a first joint portion which surrounds the cleaning solution accommodating portion, a second joint portion which extends from the first joint portion, and a third joint portion which is spaced from the second joint portion and extends from the first joint portion,
wherein an ejection pressure applying portion which extends from the cleaning solution accommodating portion to the through hole is formed between the second joint portion and the third joint portion,
wherein a width of the ejection pressure applying portion is from 0.5 cm to 3 cm, and
wherein a length of the ejection pressure applying portion is from 0.5 cm to 5 cm.

14. The cleaning apparatus of claim 13, wherein the first sealing layer supports the second sealing layer and the wiping layer.

15. The cleaning apparatus of claim 13, further comprising a supporting plate which is disposed above the first sealing layer and supports the first sealing layer, the second sealing layer, and the wiping layer.

16. The cleaning apparatus of claim 13, wherein the first sealing layer and the second sealing layer are in contact with or stuck to each other to form a temporary shutoff portion adjacent to the ejection pressure applying portion, and
wherein the temporary shutoff portion temporarily shuts off the cleaning solution accommodating portion from the through hole.

* * * * *